(12) United States Patent
Enari

(10) Patent No.: US 6,747,998 B1
(45) Date of Patent: Jun. 8, 2004

(54) TRANSMITTER FOR MULTICHANNEL DIGITAL DATA AND TRANSMISSION METHOD

(75) Inventor: Masahiko Enari, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/297,254

(22) PCT Filed: Aug. 28, 1998

(86) PCT No.: PCT/JP98/03866

§ 371 (c)(1),
(2), (4) Date: Jul. 2, 1999

(87) PCT Pub. No.: WO99/12293

PCT Pub. Date: Mar. 11, 1999

(30) Foreign Application Priority Data

Aug. 28, 1997 (JP) .............................................. 9-231941

(51) Int. Cl.[7] .............................................. H04L 12/56
(52) U.S. Cl. ........................ 370/516; 370/503; 370/537
(58) Field of Search ................................. 370/394, 535, 370/395.1, 389, 516, 537, 538, 503; 348/423.1

(56) References Cited

U.S. PATENT DOCUMENTS

| 5,379,293 A | * | 1/1995 | Kanno et al. | |
| 5,563,885 A | * | 10/1996 | Witchey | |
| 5,838,678 A | * | 11/1998 | Davis et al. | 370/389 |
| 5,914,954 A | * | 6/1999 | Nakayama | 370/394 |
| 6,236,623 B1 | * | 5/2001 | Read et al. | 368/46 |

FOREIGN PATENT DOCUMENTS

| JP | 57-30448 | 2/1982 |
| JP | 5-211508 | 8/1993 |
| JP | 7-74622 | 3/1995 |
| JP | 7-181273 | 7/1995 |
| JP | 8-46581 | 2/1996 |
| JP | 8-56204 | 2/1996 |
| JP | 8-98160 | 4/1996 |
| JP | 9-139720 | 5/1997 |
| JP | 9-252276 | 9/1997 |

* cited by examiner

*Primary Examiner*—Kenneth Vanderpuye
(74) *Attorney, Agent, or Firm*—Frommer Lawrence & Haug LLP; William S. Frommer; Dennis M. Smid

(57) ABSTRACT

A device for multiplexing multi-channel data includes a reference frequency generator 2 as clock generation means for generating a master clock, a multiplexing section 31 as multiplexing means for multiplexing a plurality of data into a packet, and a TSPP (transport stream packet pump) board 4 having a buffer memory 42 as storage means for storing the packet sent from the multiplexing section 31, so that a continuous packet stream is outputted on the basis of the master clock.

14 Claims, 16 Drawing Sheets

| QUANTITY OF TRANSFER DATA | PCR EXTENSION COUNT | PCR COUNTER VALUE | PCR EXTENSION COUNTER VALUE | ELAPSED TIME |
|---|---|---|---|---|
| 0 BYTE | 0 | 0 | 0 | 0 |
| AFTER 1 BYTE | 32 | 0 | 32 | 1.18μ SECONDS |
| AFTER 2 BYTES | 64 | 0 | 64 | 2.37μ SECONDS |
| AFTER 3 BYTES | 96 | 0 | 96 | 3.56μ SECONDS |
| AFTER M BYTES | M×32 | QUOTIENT OF M×32/300 | REMAINDER OF M×32/300 | $\frac{M \times 8 \times 4}{27 \times 10^6}$ SECONDS |
| AFTER 1 PACKET (AFTER 188 BYTES) | 6016 (20×300+16) | 20 | 16 | 222.8μ SECONDS |
| AFTER 2 PACKETS (AFTER 376 BYTES) | 12032 (40×300+32) | 40 | 32 | 445.6μ SECONDS |
| AFTER M PACKETS | M×32×188 | QUOTIENT OF (N×32×188)/300 | REMAINDER OF (N×32×188)/300 | $\frac{N \times 188 \times 8 \times 4}{27 \times 10^6}$ SECONDS |
| AFTER 843750 BYTES | 27×10⁶ | 90000 | 0 | 1 SECOND |
| AFTER 843750×K BYTES | K×27×10⁶ | QUOTIENT OF K×27×10⁶/300 | REMAINDER OF K×27×10⁶/300 | K SECONDS |
| $\frac{300x+y}{32}$ BYTES | 300Xx+y | x | y | $\frac{300x+y}{27 \times 10^6}$ SECONDS |

FIG. 8

TRANSMITTER FOR MULTICHANNEL DIGITAL DATA AND TRANSMISSION METHOD

TECHNICAL FIELD

This invention relates to a multi-channel digital data transmission device and method, and particularly to a multi-channel digital data transmission device and method which enables calculation of the quantity of transmitted data and the time required for transmission by providing a counter synchronized with a master clock.

BACKGROUND ART

Recently, a technique for digitizing, compressing and then transmitting information has been practically used. Thus, it has been possible to broadcast musical tunes of 100 channels to each household through a satellite. In such broadcast, data to be transmitted must be accurately managed.

However, with a conventional data multiplexing device, it is difficult to accurately manage the data to be transmitted and the time required for transmission.

DISCLOSURE OF THE INVENTION

In view of the foregoing status of the art, it is an object of the present invention to enable accurate management of the quantity of transmitted data and the time required for transmission by utilizing GPS (Global Positioning System) signals for data management.

A multi-channel data transmission device according to the present invention includes: clock generation means for generating a master clock; multiplexing means for multiplexing a plurality of data into a packet; and storage means for storing the packet sent from the multiplexing means; so that the packet stored in the storage means is outputted as a continuous stream by using a counter synchronized with the master clock.

A multi-channel data transmission method according to the present invention includes: a clock generation step of generating a master clock; a multiplexing step of multiplexing a plurality of data into a packet; and a storage step of storing the packet sent from the multiplexing step; so that the packet stored at the storage step is outputted as a continuous stream by using a counter synchronized with the master clock.

As described above, in the multi-channel data transmission device and method, a plurality of data are multiplexed into a packet, and a counter synchronized with a master clock is used in storing this packet in storage means and reading out this packet. Thus, the quantity of transmitted data and the time required for transmission are accurately managed, and the packet is outputted as a continuous stream.

BRIEF DESCRIPTION OF THE DRAWINGS

FIG. 8 shows the corresponding relation between a PCR counter and the quantity of transfer data and elapsed time.

BEST MODE FOR CARRYING OUT THE INVENTION

Preferred embodiments of the present invention will now be described in detail with reference to the drawings.

As an embodiment of the present invention, the structure of a data multiplexing device will be described. This data multiplexing device is a device for multiplexing data of 13 channels.

Figure 1:
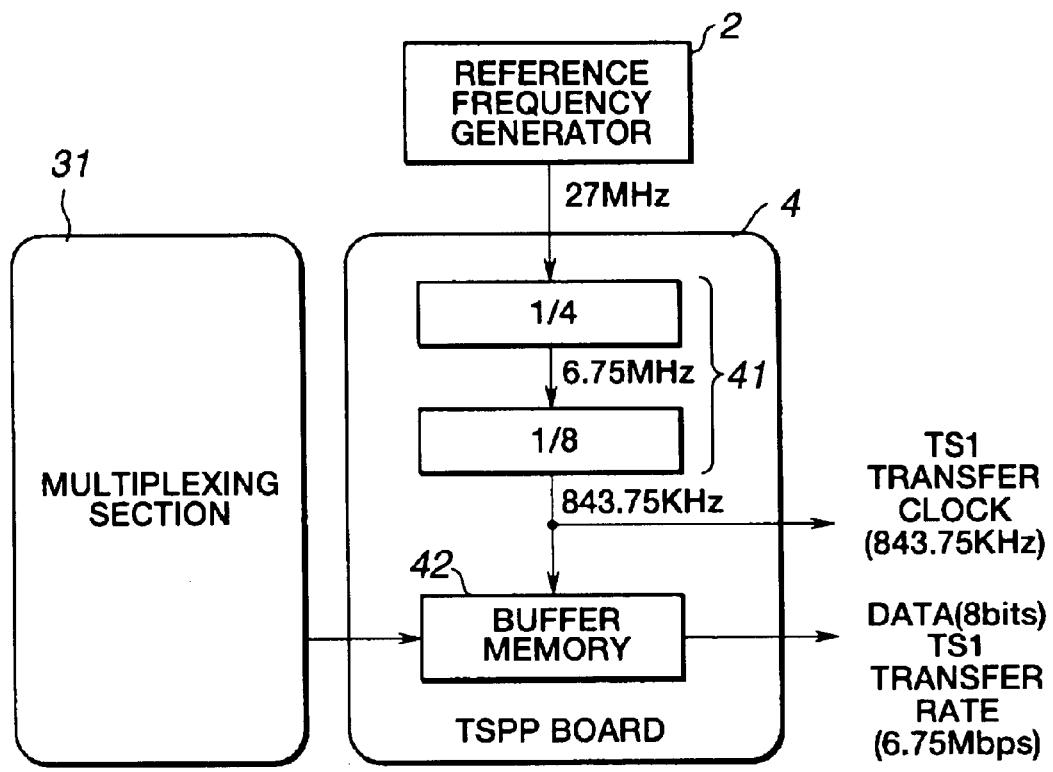
FIG. 1 is a block diagram showing the schematic structure of a data multiplexing device to which the present invention is applied.

The data multiplexing device has a reference frequency generator 2 as clock generation means for generating a master clock, a multiplexing section 31 as multiplexing means for multiplexing a plurality of data into a packet, and a TSPP (Transport Stream Packet Pump) board 4 including a buffer memory 42 as storage means for storing the packet sent from the multiplexing section 31, as shown in FIG. 1.

In the TSPP board 4, first, a signal of 27 MHz of the master clock generated by the reference frequency generator 2 has its frequency divided to ¼, that is, 6.75 MHz. The signal has its frequency further divided to ⅛, that is, 843.75 kHz, and then supplied to the buffer memory 42. The signal of 843.75 kHz is outputted as a transport stream (TS) 1 transfer clock. From the buffer memory 42, 8-bit data is outputted at a TS1 transfer rate of 6.75 Mbps.

Figure 2:
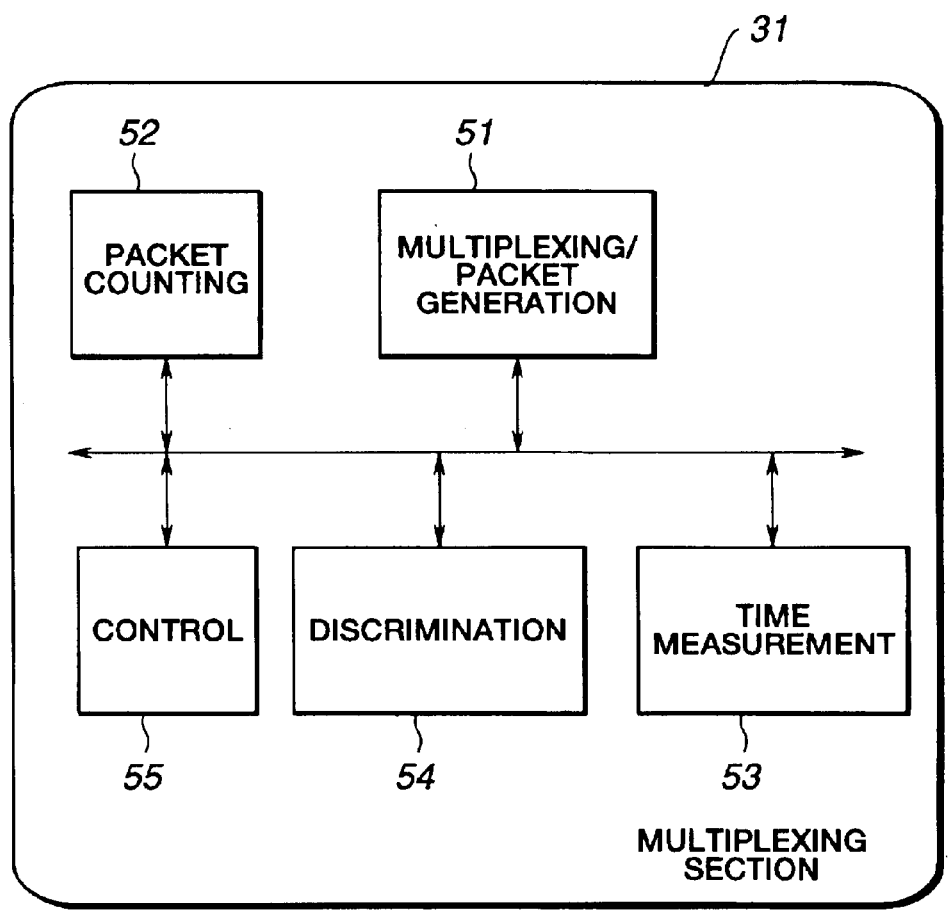
FIG. 2 is a block diagram showing the structure of a multiplexing section of the data multiplexing device of FIG. 1.

The multiplexing section 31 has a multiplexing/packet generating section 51 for multiplexing a plurality of data to generate a packet, a packet counting section 52 as packet counting means for counting the number of packets outputted from the buffer memory, a time measurement section 53 as time measurement means for measuring the time, a discriminating section 54 as discrimination means for discriminating whether the number of packets counted by the packet counting section is a predetermined number or not, on the basis of the time measured by the time measurement section, and a control section 55 for controlling generation of packets in the multiplexing/packet generating section in accordance with the discrimination result of the discriminating section, as shown in FIG.2.

Figure 3:
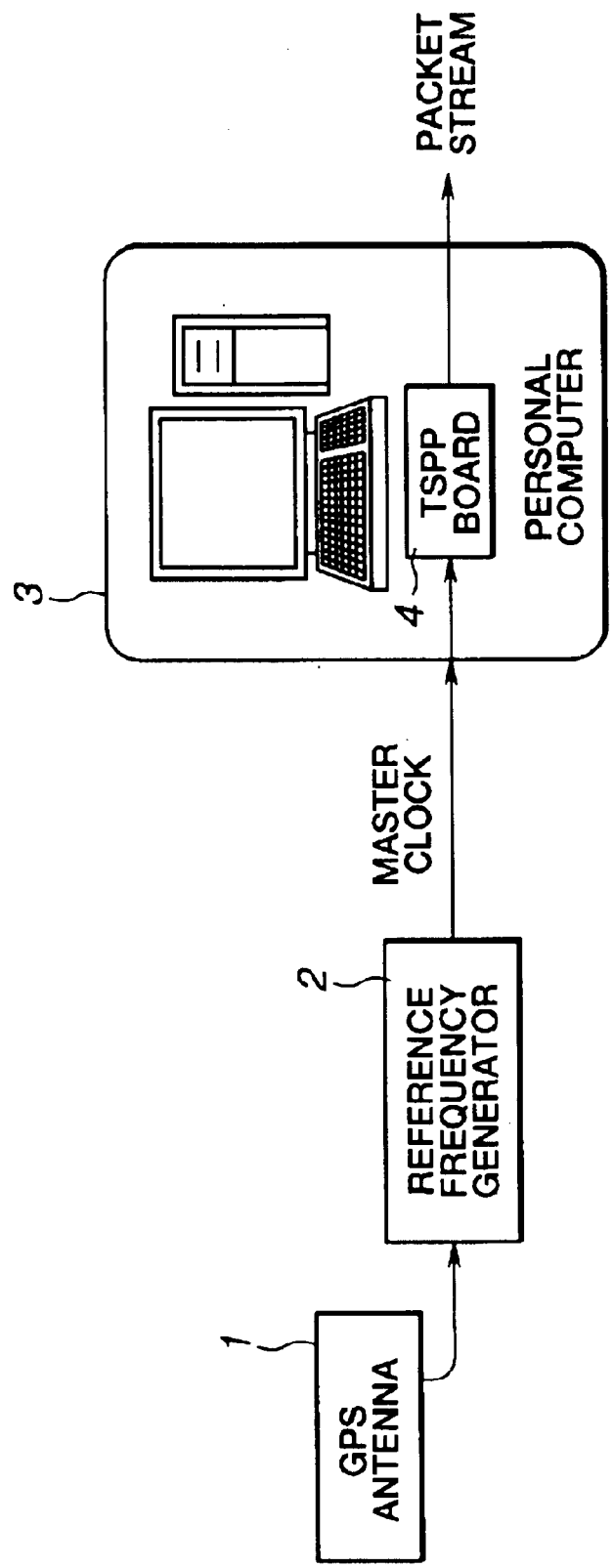
FIG. 3 is a block diagram showing the structure of the data multiplexing device to which the present invention is applied.

This data multiplexing device operates with reference to signals from a GPS (Global Positioning System) satellite. Specifically, in the data multiplexing device, a GPS antenna 1 receives signals from a GPS satellite (now shown) and outputs the signals to the reference frequency generator 2, as shown in FIG.3. On the basis of the inputted signals from the satellite, the reference frequency generator 2 generates a master clock having a frequency of 27 MHz and a frequency stability of $5 \times 10^{-12}$/day, and outputs the master clock to a TSPP board 4 provided inside a personal computer 3. The TSPP board 4 outputs multiplexed data as a packet stream at predetermined timing.

Figure 4:
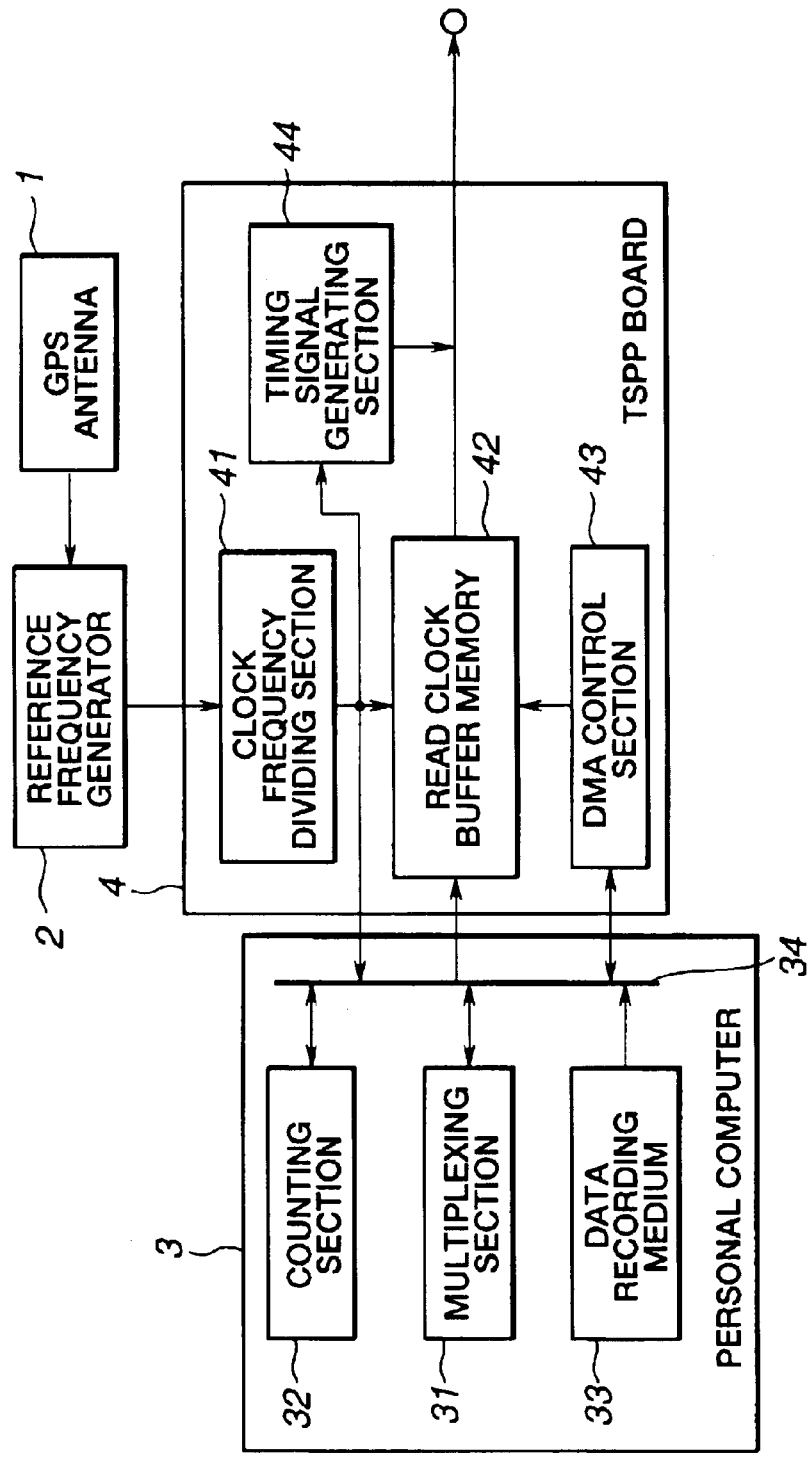
FIG. 4 is a block diagram showing the internal structure of the data multiplexing device of FIG. 3.

The structure of the personal computer 3 and the TSPP board 4 provided inside the personal computer 3 will be described with reference to FIG.4. The multiplexing section 31 multiplexes data recorded on a data recording medium 33, and outputs the multiplexed data to the buffer memory 42. A counting section 32 generates and manages a program clock reference value (PCR) for adding a clock reference to the multiplexed data. The multiplexing section 31 and the counting section 32 are functional blocks which carry out separately inputted programs. On the data recording medium 33, data compressed in accordance with the MPEG (Moving Picture Experts Group) system are recorded.

A clock frequency dividing section 41 of the TSPP board 4 generates a TS1 transfer clock based on the master clock inputted from the reference frequency generator 2, and outputs the TS1 transfer clock to the buffer memory 42, a timing signal generating section 44, and the counting section 32 through a CPU bus 34. The buffer memory 42 stores the multiplexed data which is DMA-transferred from the multiplexing section 31 through the CPU bus 34 under the control of a DMA (Dynamic Memory Access) control section 43, and outputs the stored data synchronously with the TS1 transfer clock inputted from the clock frequency dividing section 41. The timing signal generating section 44 simultaneously outputs the TS1 transfer clock, the data synchronized with the TS1 transfer clock, and timing signals (PYNC, DVALID). The DMA control section 43 controls writing of data into the buffer memory 42.

The operation of this data multiplexing device will be described hereinafter with reference to the flowchart of FIG.5. At step S1, the GPS antenna 1 receives signals from the GPS satellite and outputs the signals to the reference frequency generator 2. At step S2, the reference frequency generator 2 generates a master clock having a frequency of 27 MHz and a frequency stability of $5 \times 10^{-12}$/day on the basis of the inputted signals, and outputs the master clock to the clock frequency dividing section 41. At step S3, the clock frequency dividing section 41 generates a TS1 transfer clock from the inputted master clock, and outputs the TS1 transfer clock to the buffer memory 42, the timing signal generating section 44, and the counting section 32 through the CPU bus 34.

The processing carried out by the clock frequency dividing section 41 at step S3 will now be described in detail with reference to FIG. 1.

The master clock of 27 MHz is divided by $2^2$, thereby generating a clock of 6.75 MHz. Moreover, this clock of 6.75 MHz is divided by $2^3$, thereby generating a TS1 transfer clock of 843.75 kHz. Since the clock of 6.75 MHz (corresponding to a TS1 transfer rate of 6.75 Mbps) and the TS1 transfer clock of 843.75 kHz (corresponding to a transfer rate of every 1 byte (8 bits)) are in the integral proportion with the master clock of 27 MHz, these clocks are held in synchronization with the master clock.

Referring to FIG.5 again, at step S4, the multiplexing section 33 reads out MPEG-compressed data from the data recording medium 33 and multiplexes the read-out data. The multiplexed data is DMA-transferred and written to the buffer memory 42 under the control of the DMA control section 43. At step S5, the multiplexed data, timing signals (PSYNC, DVALID) and the TS1 transfer clock are outputted as a packet stream.

Figure 6:
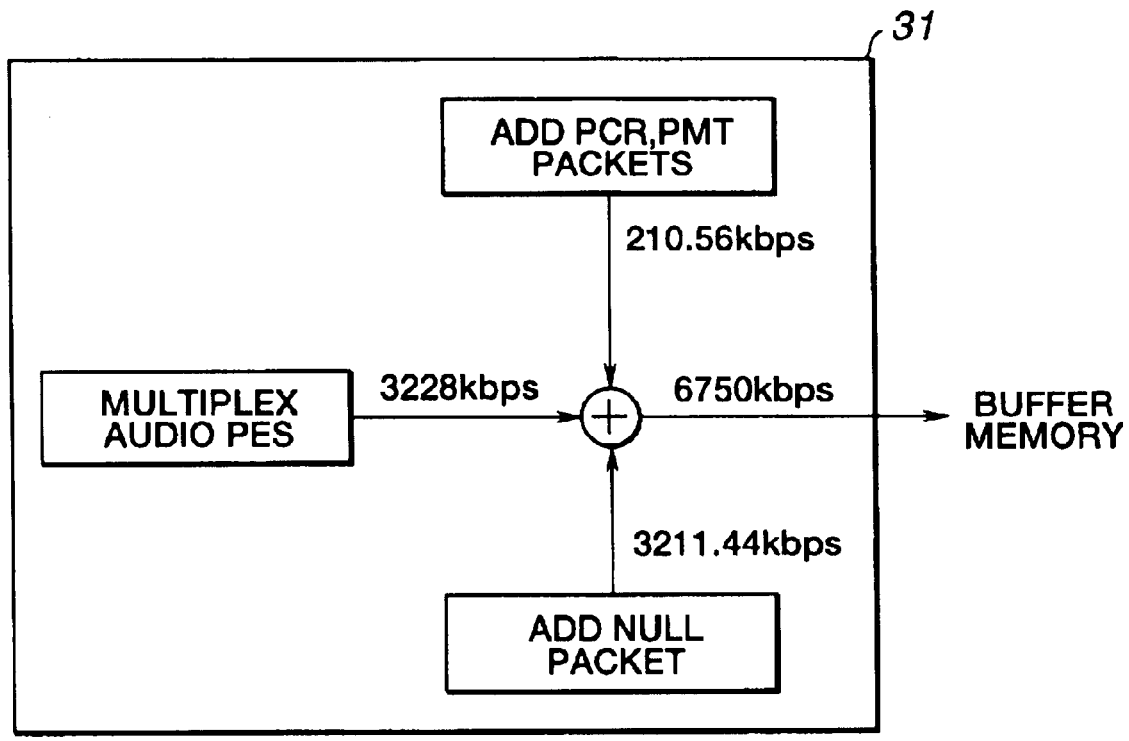
FIG. 6 illustrates processing carried out by the multiplexing section of FIG. 4.

The processing of step S4 will be described with reference to FIG.6. In the case where audio data (audio PES) of 256 kbps for 13 channels are to be multiplexed in one channel, the transfer rate of the data to be multiplexed is as follows. That is, the transfer rate of the audio data is 256 kbps×13= 3328 kbps. The PMT (program map table) corresponding to each channel consists of 188 bytes and it is required 10 times a second. Therefore, the transfer rate of the PMT is 10×188× 8×13=195.52 kbps. The PCR (Program Clock Reference) consists of 188 bytes and it is required 10 times a second. Therefore, the transfer rate of the PCR is 10×188×8 15.04 kbps. Thus, the effective rate is 3538.56 kbps obtained by totaling the transfer rates of the three types of data, that is, the audio data, PMT and PCR (hereinafter referred to as effective data).

To transfer the effective data at the TS1 transfer rate of 6750 kbps synchronized with the master clock, a null packet of 3211.44 kbps may be multiplexed to the effective data. That is, the effective rate 3538.56 kbps+the null packet 3211.44 kbps=6750 kbps.

Figure 7A:
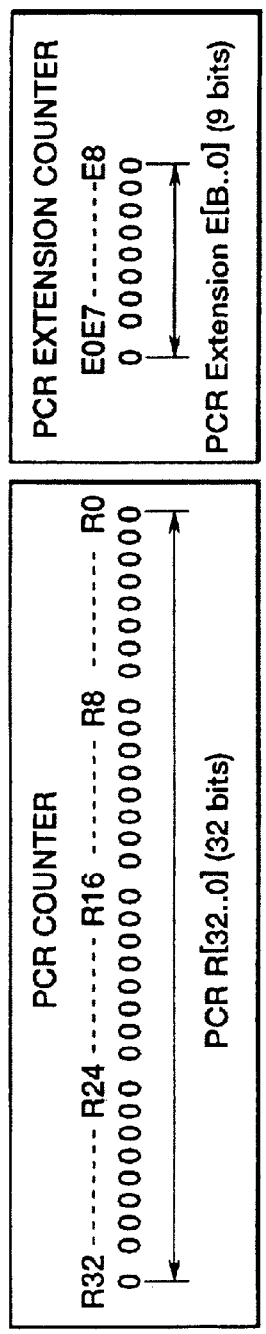
FIG. 7A illustrates processing carried out by a counting section of FIG. 4.
Figure 7B:
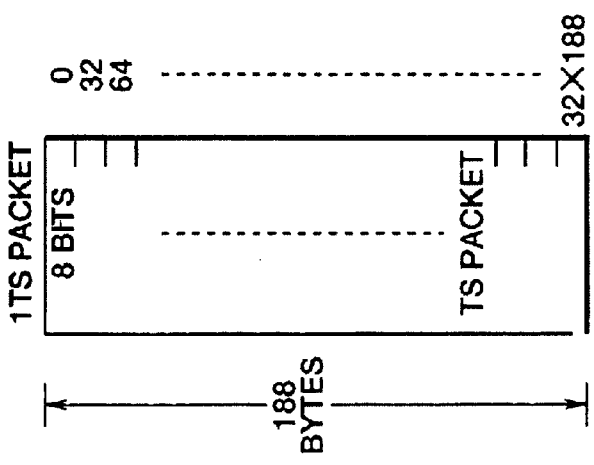
FIG. 7B illustrates processing carried out by the counting section of FIG. 4.

The PCR will now be described with reference to FIGS. 7A and 7B. The PCR is a signal generated by the counting section 32, and is information to be the reference for the time in decoding the multiplexed data. As shown in FIG.7A, the PCR is a counter signal synchronized with the master clock, and includes two counters, that is, a PCR Extension counter expressed by 9 bits (E0 to E8) and a PCR counter expressed by 33 bits (R0 to R32). The PCR Extension counter cyclically carries out count-up from 0 to 299 at 27 MHz and advances the PCR counter at 300. The PCR counter is a counter of 27 MHz/30=90 kHz since it carries out count-up every time the PCR Extension counter counts up one cycle (0 to 299). For example, as shown in FIG.7B, on the assumption that the TS1 transfer rate is 6.75 Mbps and the initial value of the PCR Extension counter is 0, the value of the PCR Extension counter after transfer of 1 byte (8 bits) is 32. The PCR Extension counter after transfer of one packet (188 bytes) carries out counting 32×188=6016 times, and advancement of the PCR counter is generated during this counting. Thus, the value of the PCR counter becomes 20 and the value of the PCR Extension counter becomes 16.

Since the above-described TS1 transfer rate and TS1 transfer clock are also synchronized with the master clock, the quantity of data multiplexed and written in the buffer memory 43 and the elapsed time required for writing can be easily found from the values of the PCR Extension counter and the PCR counter which are managed by the counting section 32. For example, if the PCR counter value is x and the PCR Extension counter value is y, the quantity of data transferred to the buffer memory 42 is (300x+y)/32 bytes and the time required for transfer is (300x+y)/(27×106)

seconds. FIG. 8 shows the corresponding relation between the quantity of data and the elapsed time. The PCR Extension count shown in FIG. 8 is the number of times the PCR Extension counter carries out count-up at 27 MHz. Practically, the PCR Extension counter advances the PCR counter value every time it counts 300 times.

Figure 9:
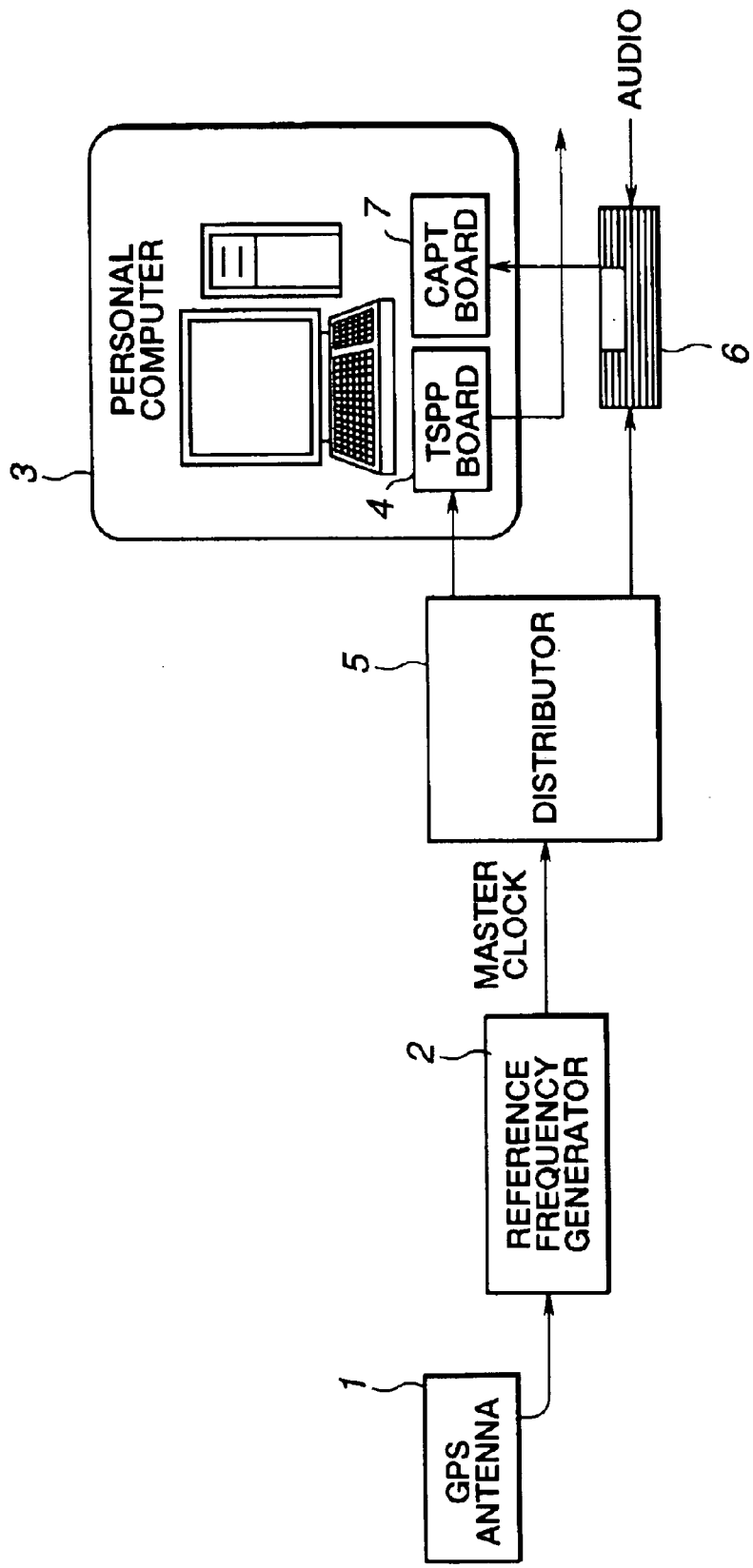
FIG. 9 is a block diagram showing the structure of a data multiplexing device to which the present invention is applied.

The device for multiplexing the audio data of 13 channels which are MPEG-compressed and filed is described above. Next, a data multiplexing device for multiplexing audio data of 12 channels which are MPEG-compressed and filed and real-time data of one channel will be described with reference to FIGS. 9 and 10. As shown in FIG. 9, this data multiplexing device is constituted by adding a distributor 5, a real-time MPEG compression device 6 and a CAPT board 7 to the data multiplexing device of FIGS. 3 and 4.

Figure 10:
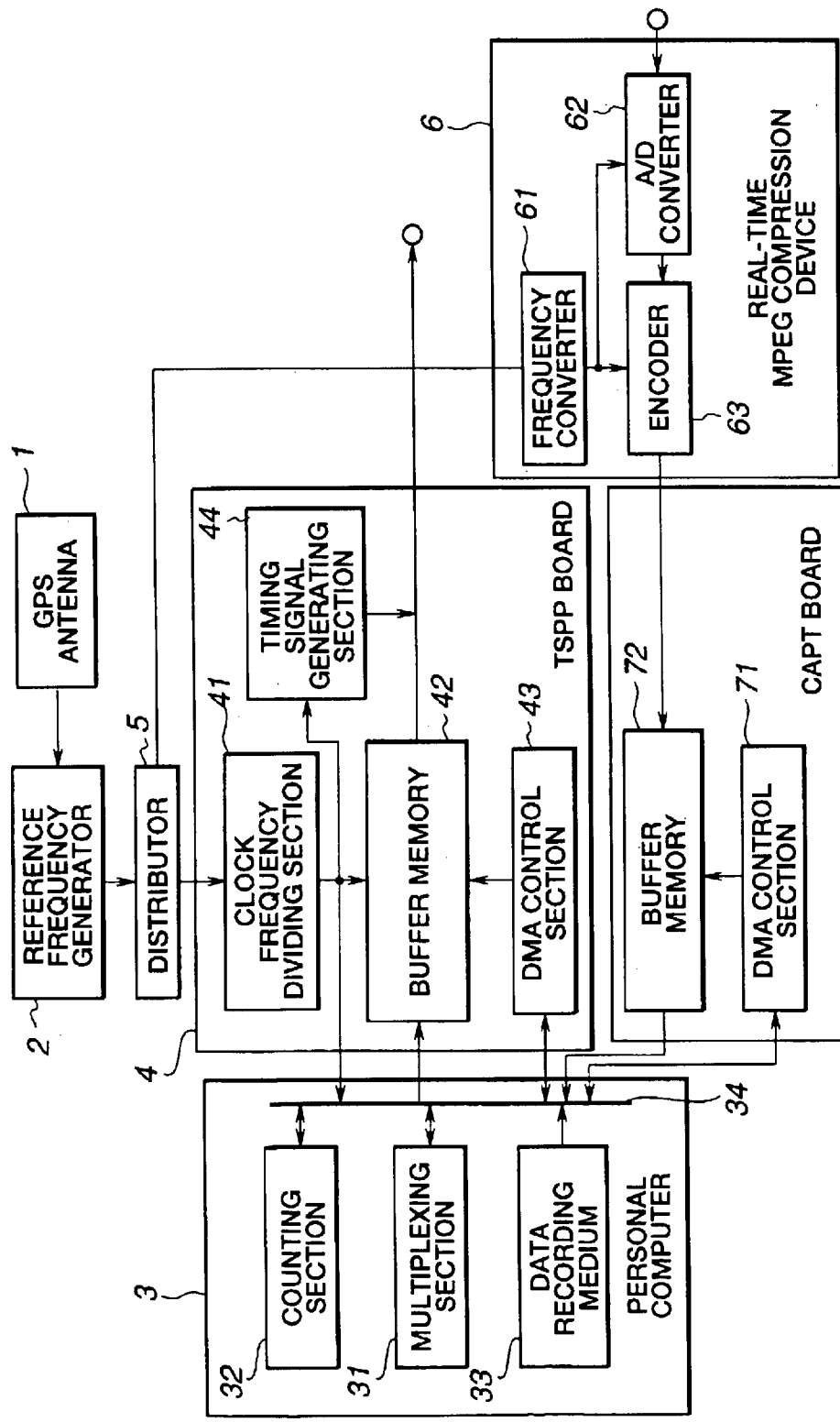
FIG. 10 is a block diagram showing the structure of the data multiplexing device of FIG. 9.

As shown in FIG. 10, the distributor 5 distributes a master clock inputted from a reference frequency generator 2 to a clock frequency dividing section 41 in a TSPP board 4 and a frequency converter 61 in the real-time MPEG compression device 6. In the real-time MPEG compression device 6, an A/D converter samples inputted real-time audio signals by a sampling frequency (48 kHz) generated by the frequency converter 61, then converts the audio signals to digital data, and outputs the digital data to an encoder 63. The encoder 63 compresses the inputted digital data in accordance with the MPEG system, and outputs the MPEG-compressed digital data to a buffer memory 72 of the CAPT board 7 at a transfer rate (256 kbps) synchronized with the master clock.

In the CAPT board 7, a DMA control section 71 carries out DMA-transfer of the MPEG-compressed data stored in the buffer memory 72 to a multiplexing section 31 through a CPU bus 34 at predetermined timing. The multiplexing section 31 multiplexes the data of 256 kbps inputted from the buffer memory 72 and the data of 12 channels of 256 kbps reproduced from a data recording medium 33. The subsequent processing is similar to the processing described with reference to the data multiplexing device of FIG. 4 and therefore will not be described further in detail.

Figure 11:
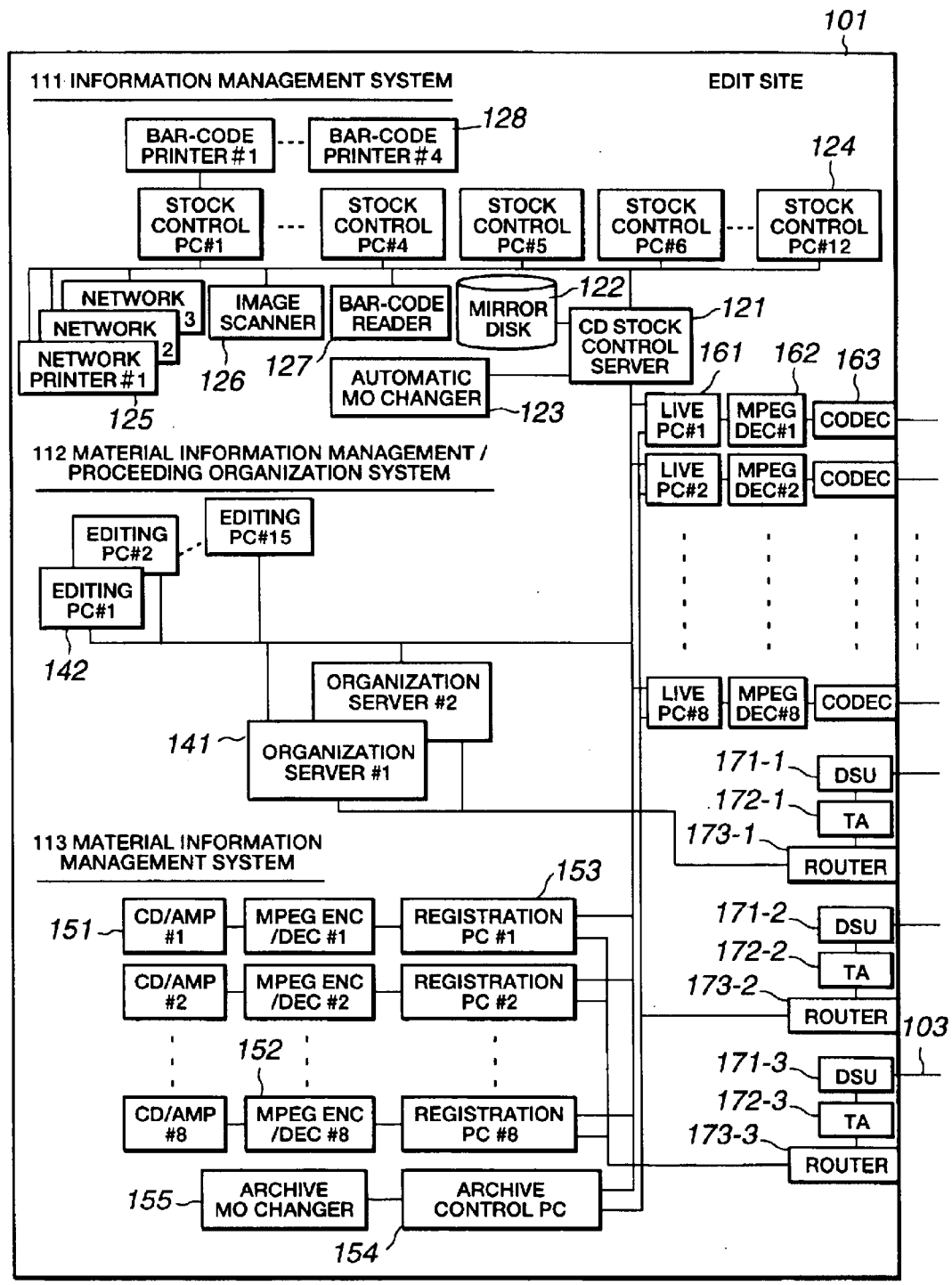
FIG. 11 is a block diagram showing the structure of an edit site of a 100-channel automated digital broadcasting system to which the present invention is applied.
Figure 12:
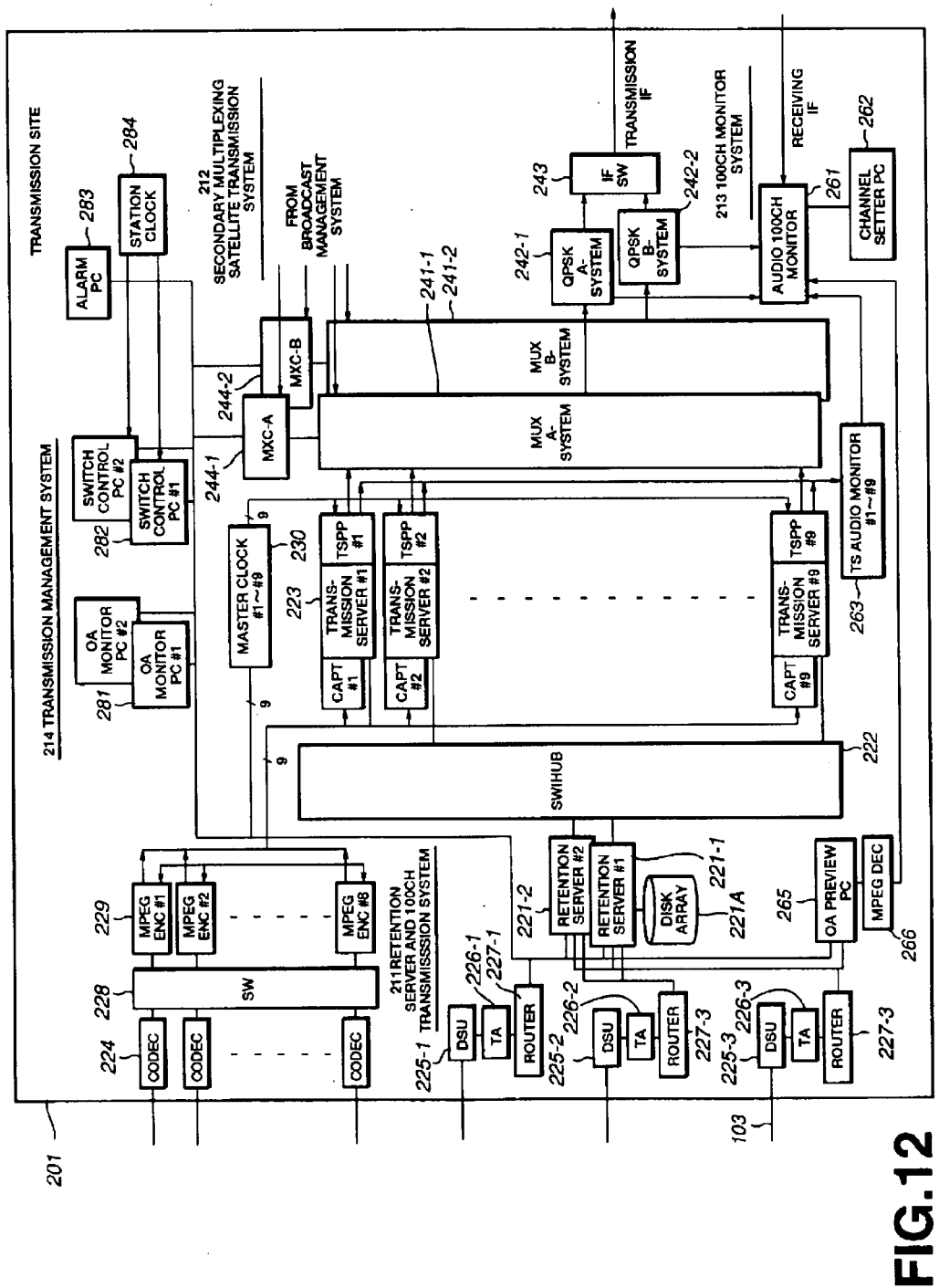
FIG. 12 is a block diagram showing the structure of a transmission site of the 100-channel automated digital broadcasting system to which the present invention is applied.

A 100-channel automated digital broadcasting system to which the present invention is applied will now be described with reference to FIGS. 11 and 12. FIG. 11 shows the structure of an edit site 101 and FIG. 12 mainly shows the structure of a transmission site 201. This system is an automated digital broadcasting system for broadcasting 100 channels of music files compressed in accordance with the MPEG (Moving Picture Experts Group) system, by using one satellite transponder. In this specification, the term "system" is used to express the entire device constituted by a plurality of devices and units.

This system is constituted by the edit site 101 for producing broadcast programs and the transmission site 201 for transmitting the programs, and these sites are connected by a dedicated line 103 such as a local area network (LAN). In the edit site 101, an information source management system 111, a material information management/proceeding organization system 112, and a material information registration system 113 are provided. In the transmission site 201, a retention server and 100-channel transmission system 211, a secondary multiplexing satellite transmission system 212, a 100-channel monitor system 213, and a transmission management system 214 are provided.

In this system, since musical tunes are broadcast to each user through the satellite, CDs are used as the information source. The information source management system 111 carries out management of the CDs, that is, media, and management of musical tunes recorded on the CDs as the sound source. Therefore, the information source management system 111 has a CD stock control server 121. To this CD stock control server 121, a hard disk (mirror disk) 122 and an automatic MO changer 123 are connected. The hard disk 122 registers information necessary for an MO disk to be driven by the MO changer 123, and thus forms database.

Also, 12 units of stock control personal computers (PCs) 124 are connected to the CD stock control server 121. In this specification, these stock control PCs are described as stock control PC 124-1 to stock control PC 124-12 if the individual stock control PCs must be discriminated. If there is no need for discrimination, the stock control PCs are described simply as stock control PCs 124.

Moreover, in the information source management system 111, three network printers 125-1 to 125-3, an image scanner 126, a bar-code reader 127, and four bar-code printers 128-1 to 128-4 are provided. The network printers 125 are used for printing various forms. The bar-code printers 128 are used for printing bar codes to be attached to the managed CDs. The bar-code reader 127 is used for reading the bar code attached to each CD. The image scanner 126 is used for entering music, lyrics and other information accompanying the CDs.

All the information related to the CDs is stored in the database on the hard disk 122. CD stock control is carried out as follows.

1. A CD stock controller registers CD order information to the CD stock control server 121 from the stock control PC 124, and orders CDs by sending a CD order form outputted from the server 121 through the network printer 125 to a dealer.
2. As the CDs are stored in the warehouse, the CD stock controller registers warehouse information from the stock control PC 124, and inputs all the information related to CD media necessary for search for stock control and all the information related to the musical tunes (sound source) recorded on the CDs into the database of the CD stock control server 121. This information includes information inputted in the form of text such as the title, name of artist, time, genre, and keyword, and an jacket image inputted by the image scanner 126. In addition, the information includes information inputted in the form of electronic data such as detail information related to lyrics, albums or musical tunes, photograph, MIDI data, and timing of start of singing in karaoke. The information inputted here is information related with the album (all the tunes of CD) and musical tunes, and information accompanying or associated with them. This information does not include management information and hysteresis information related to transmission and broadcast. (These are registered to organization servers 141, as will be later described.)
3. The CD stock control server 121 stores the information onto the hard disk 122, then generates CD medium management numbers in the order of acceptance, and issues bar-code labels from the bar-code printer 128.
4. The CD stock controller stores the CDs on a management shelf in the order of the CD medium management numbers.
5. The CD user visits the reception desk of the information management system 111, then tells the CD medium management number, and thus can rent the CD.

In this information source management system 111, other media such as DAT, compact cassettes, and records are managed, too.

One CD control management server 121 carries out back-up of all the information once a week by using the hard disk 122 as a mirroring structure and by using an MO disk, and every day backs up information with respect to information (difference) inputted on the day. Ordering, storage in the warehouse, input of information, search, and lending are carried out by the 12 stock control PCs 124 as clients. The maximum quantity of stored information with respect to musical tunes is one million items.

The material information management/proceeding organization system 112 is constituted by two organization servers 141-1,141-2, and 15 editing PCs 142-1 to 142-15 connected to the organization servers 141-1, 141-2. Each of the organization servers 141 has a hard disk, not shown. The material information management/proceeding organization system 112 carries out management of musical tunes to be broadcast, and organization of a proceeding table. In the proceeding table, a material to be broadcast and the broadcast start time and broadcast interval of the material are recorded. Material information of musical tunes necessary for broadcast and the proceeding table for each channel are all stored on the hard disk of the organization server 141. The material means musical tunes which are MPEG-compressed (encoded) and filed. The material information means information of a material encoded by the material information registration system 113 or a material necessary for broadcast which is requested to be encoded.

Material information management and proceeding organization are carried out as follows. The organizer prepares a proceeding table of a channel of which the organizer is in charge, from the editing PC 142.

1. The organizer searches material information of the organization server 141 for a musical tune which the organizer intends to broadcast. If a target material is found, that musical tune is dragged to an organization frame on a graphical user interface (GUI) of the editing PC 142. At this point, the playing time of the dragged musical tune is the real tim in broadcast. In the organization frame, it is indicated that this musical tune is "recorded".

2. If the organizer cannot find the target material as a result of search of the material information of the organization server 141 for the musical tune which the organizer intends to broadcast, the organizer searches the CD stock control server 121. If the target musical tune is found, that musical tune is dragged on the GUI of the editing PC 142. At this point, the playing time of the dragged musical tune is the time in CD stock control, and the time as a result of recording might be different from this playing time. In this case, since material information registration (encoding) has not been carried out, it is indicated in the organization frame that the musical tune is "unrecorded". The unrecorded musical tune is sequentially notified of as a recording candidate to the material information registration system 113. As the unrecorded musical tune is encoded, the "unrecorded" material is changed to the "recorded" material on the organization server 141. At this point, the playing time of the material is the real time in broadcast.

If the target musical tune cannot be found as a result of search of the CD stock control server 121, the target musical tune is caused to be a temporary candidate after a CD order request is outputted to the CD stock control server 121. As storage in the warehouse and CD stock control registration have been done, the above-described proceeding is carried out and encoding is carried out. Ultimately, it is indicated in the organization frame that all the musical tunes are "recorded".

3. At the time when all the musical tunes are "recorded" in the organization frame, the organizer carries out matching check on the GUI of the editing PC 142. The matching check is to evenly allocate the material designated in the organization frame and check whether the reproduction time and the time between tunes (silence) are within predetermined values or not. For example, in the case where 12 musical tunes, each having a length of approximately 5 minutes, are to be broadcast in a program of one hour, if each of 11 musical tunes has a length of exactly 5 minutes while one musical tune has a length of 6 minutes, the total reproduction time exceeds the organization frame (one hour). Also, if each of the tunes has a length of exactly 5 minutes, there is no silence portion between the tunes and the broadcast becomes awkward. Thus, a lower limit value (for example, 1.5 seconds) and an upper limit value (for example, 3 seconds) of the time (silence) between tunes in broadcasting the material are set, and it is checked whether or not the time (silence) between tunes falls within this range in the case where all the tunes are evenly allocated. If the time between tunes does not fall within this range, a material of a different playing time is substituted or a material prepared in advance for time adjustment is put at the last part of an organization frame of relatively short organization so as to pass the check.

The playing time of these materials is calculated on the basis of the time of material information database (material after encoding) on the organization server 141, instead of the time of the database on the CD stock control server 121.

In this manner, the proceeding table (file) of one channel for one day is prepared. Ultimately, the organization manager approves this proceeding table, and the approved proceeding table (file) is locked so as not to be overwritten. Then, the proceeding table is transferred to an external hard disk 221A of a retention server 221 in the transmission site 201 through the dedicated line 103.

4. Thus, in the organization server 141, the proceeding table for each channel and for each broadcasting day is saved as database. Also, in the organization server 141, data related with the material already stored on the external hard disk 221A of the retention server 221 as a broadcasting material, and data related with an unrecorded material which is scheduled to be broadcast in the future and should be stored on the external hard disk 221A of the retention server 221 are stored as database of material information. These data are data obtained by leading out items necessary for broadcast from the database of the CD stock control server 121 and adding thereto information related to broadcast such as the broadcasting date, broadcasting channel, and organizer.

The two organization servers 141-1, 141-2 have their respective external hard disks, not shown, and conduct dual operation. In the 15 editing PCs 142-1 to 142-15, organization tables are prepared by searching the organization server 141 and searching the CD stock control server 121. The maximum quantity of stored information of the organization server 141 with respect to materials is one million items.

The material information registration system 113 has eight CD players and amplifiers 151-1 to 151-8. Eight MPEG encoders/decoders 152-1 to 152-8 encode reproduction outputs of the CD players and amplifiers 151-1 to 151-8, and outputs the encoded outputs to eight registration PCs 153-1 to 153-8. The registration PCs 153-1 to 153-8 output the data supplied from the encoders/decoders 152-1 to 152-8, from a router 173-3, a terminal adaptor (TA) 172-3 and a digital service unit (DSU) 171-3 to a DSU 225-3 of the transmission site 201 through the dedicated line 103.

Also, eight live PCs 161-1 to 161-8 are connected to the registration PCs 153-1 to 153-8. Data outputted from the live PCs 161-1 to 161-8 are decoded by MPEG decoders 162-1 to 162-8, and are then supplied from coder-decoders (CODEC) 163-1 to 163-8 to CODECs 224-1 to 224-8 of the transmission site 201 through the dedicated line 103.

At this point, the outputs of the MPEG decoders 162-1 to 162-8 are suitably added to inputs from a microphone, not shown, and are then outputted from the CODECs 163.

An archive MO changer 155 is connected to an archive control PC 154, and archive data is stored onto an MO disk driven by the archive MO changer 155. The archive control PC 154 is connected to the registration PC 153, the live PCs 161, the stock control server 121, the organization servers 141, and the editing PCs 142. Also, the archive control PC 154 is connected to a DSU 225-2, a terminal adaptor 226-2 and a router 227-2 of the transmission site 201 and further to the retention server 221, a router 173-2, a terminal adaptor 172-2 and a DSU 171-2 through the dedicated line 103.

The material information registration system 113 is a system for realizing a function to reproduce a musical tune from a storage medium such as a CD by the CD player and amplifiers 151, then compress (encode) the musical tune by the MPEG encoders/decoders 152 to make a material file, and transfer the material file to the retention server 221 through the registration PCs 153, the router 173-3, the terminal adaptor 172-3, the DSU 171-3, the dedicated line 103, the DSU 225-3, the terminal adaptor 226-3 and the router 227-3. Also, the material information registration system 113 is a system for realizing a function to delete a material in the retention server 221 or transfer a material in the retention server 221 to the archive MO changer 155 through the router 227-2, the terminal adaptor 226-2, the DSU 225-2, the dedicated line 103, the DSU 171-2, the terminal adaptor 172-2, the router 173-2 and the archive control PC 154. In addition, the material information registration system 113 is a system for realizing a function to select an arbitrary musical tune in the retention server 221 and reproduce the music through the router 227-3, the terminal adaptor 226-3, the DSU 225-3, the dedicated line 103, the DSU 171-3, the terminal adaptor 172-3, the router 173-3, the registration PCs 153, the MPEG encoders/decoders 152, and the CD players and amplifiers 151.

If the target material is not found as a result of searching the material information of the organization servers 141 in the material information management/proceeding organization system 112 for the musical tune which the organizer intends to broadcast, but the target material is found by searching the CD stock control server 121, that musical tune is dragged on the GUI of the editing PC 142. In this case, since material information registration (encoding) has not been carried out, it is indicated in the organization frame that the musical tune is "unrecorded". Thus, the unrecorded musical tune is notified of as a recording candidate to the material information registration system 113 through the dedicated line 103.

The operator in charge of material information registration reserves a musical tune to be registered, from among the unrecorded material registration candidates, that is, the unrecorded musical tunes. This processing is to prevent duplication of operation with other operators in charge. After the reservation, the operator in charge of material information registration visits the lending counter of the information source management system 111 and rents a necessary CD medium. At this point, since the material information led out on the editing PC 142 is the information on the database of the CD stock control server 121, the target CD medium can be instantaneously led out by using the CD medium management number.

At a booth for carrying out material registration, checking is carried out to electronically match the musical tune of the material registration candidate and the musical tunes of the actually rented CD medium. Since a value uniquely determined with respect to a musical tune found by a given constant operational expression is calculated from the playing time and the track number with respect to one musical tune in CD stock control registration and is saved in the database as a matching ID, the foregoing checking can be realized by determining whether the value found again by the arithmetic operation coincides with the value when the CD medium is actually rented.

The checked musical tune is processed by the CD players and amplifiers 151, then encoded in real time by the MPEG encoders/decoders 152, and stored as an MPEG file on hard disks, not shown, of the registration PCs 153. The file (material) which has been written is transferred to the external hard disk 221A of the retention server 221 in the transmission site 201 through the dedicated line 103. In addition, the file (material) stored on the external hard disk 221A of the retention server 221 in the transmission site 201 is transferred to the hard disks, not shown, of the registration PCs 153 in the edit site 101 through the dedicated line 103. The operator in charge of material information registration reproduces the file (material) transferred from the retention server 221 by using the MPEG encoders/decoders 152, and carries out test listening of the sound from the beginning to the end. The material which is found trouble-free by test listening becomes a "recorded" material.

MPEG filing of the musical tune can be carried out by the following method.

1. Music (base band) is reproduced by a real-time reproducing device (for example, a CD player) as the CD player and amplifier 151, and the reproduced music is compressed by a real-time encoder as the MPEG encoder/decoder 152. The compressed data is stored on a hard disk, not shown, of the registration PC 153.
2. Data is read out by an N-multiple-speed reproducing device, for example, an 8-multiple speed CD-ROM player, as the CD player and amplifier 151, and the read data is compressed by an 8-multiple-speed encoder as the MPEG encoder/decoder 152. The compressed data is stored on the hard disk, not shown, of the registration PC 153. N is a number greater than 1 including decimal fractions.
3. Data is read by a variable multiple-speed reproducing device (for example, a CD-ROM player) as the CD player and amplifier 151, and the read data is temporarily stored directly into an internal memory or the hard disk of the registration PC 153. Then, the data is encoded by software means and stored onto the hard disk. The variable multiple speed in this case includes burst reading control.
4. A file which is already encoded outside is received and stored onto the hard disk, not shown, of the registration PC 153.

In the material information registration system 113, transmission of musical tunes through live broadcast by a disc jockey (DJ) is carried out, using the method for decoding and reproducing, by the MPEG decoder 162, the file (material) transferred from the retention server 221 through the router 227-2, the terminal adaptor 226-2, the DSU 225-2, the dedicated circuit 103, the DSU 171-2, the terminal adaptor 172-2, the router 173-2 and the live PC 161. The organization server 141 is searched for the musical tune which is intended to be broadcast, from the live PC 162 as a DJ terminal, and whether the target musical tune is already recorded or not is examined. The material is transferred from the retention server 221 of the transmission site 201 through the dedicated line 103, and the musical tune is reproduced (decoded) by the decoder 162. At this point, audio signals gathered from a microphone, not shown, are A/D converted and superimposed (mixed) on the output of the MPEG decoder 162.

Since the capacity of the external hard disk 221A of the expensive high-speed retention server 221 is limited, it will be saturated sooner or later. Thus, the capacity of the external hard disk 221A of the retention server 221 is constantly monitored, and materials as deletion candidates are displayed on the archive control PC 154 in accordance with a preset condition. The condition is that a deletion candidate is a material which has been broadcast twice or less in the past year or a musical tune designated in advance as a deletion candidate after the end of broadcast. On the contrary, a material which is designated in advance at the time of material registration so as not to be a deletion candidate is eliminated from the deletion candidates. As the material manager designates a musical tune to be actually deleted, a musical tune to be archived onto the MO disk, and a musical tune to be eliminated from the deletion candidates, such processing is automatically carried out. The musical tune archived on the MO disk of the archive MO changer 155 can be returned to the external hard disk 221A of the retention server 221 by batch processing, if it becomes necessary for organization. Therefore, the retention server 221 and the archive control PC 154 are interconnected through the router 227-2, the terminal adaptor 226-2, the DSU 225-2, the dedicated line 103, the DSU 171-2, the terminal adaptor 172-2 and the router 173-2.

Thus, if it is identified that the material designated on the proceeding table is the archived material, when a predetermined time has come, the organization server 141 controls the archive control PC 154 by batch processing to read out the material held in the archive MO changer 155. Then, the organization server 141 transfers the material to the retention server 221 and causes the retention server 221 to retain the material.

Of course, the organizer may carry out manual operation, if necessary, to transfer the archived material to the retention server 221 and cause the retention server 221 to retain the material.

In addition, it is possible to select, if necessary, whether to stop or continue the function to automatically transfer the archive material designated on the proceeding table to the retention server 221. Thus, erroneous restoration of the archived material to the retention server 221 is restrained.

The retention server and 100-channel transmission system 211 has two retention servers 221-1 and 221-2. To these retention servers 221, for example, hard-disks (disk arrays) 221A having a capacity of 500 GB are connected, respectively. The retention servers 221 are connected to the organization servers 141 through the router 227-1, the terminal adaptor 226-1, the DSU 225-1, the dedicated line 103, and the DSU 171-1, the terminal adaptor 172-1 and the router 173-1 of the edit site 101.

Also, to the retention servers 221, nine transmission servers 223-1 to 223-9 are connected through a HUB 222 on the dedicated line 103. In each of the transmission servers 223-1 to 223-9, a CAPT board and TSPP board are provided. Also, a hard disk, not shown, having a capacity of 20 GB is connected to each of the transmission servers 223-1 to 223-9.

The CAPT boards provided in the transmission servers 223-1 to 223-9 are supplied with outputs of MPEG encoders 229-1 to 229-9. The MPEG encoders 229-1 to 229-9 encode and output data which are supplied to the CODECs 224-1 to 224-8 of the transmission site 201 and inputted therefrom through a switch 228.

Of the transmission servers 223-1 to 223-9 and the MPEG encoders 229-1 to 229-9, one transmission server 223 and one MPEG encoder 229 are reserved as spare units (stand-by units), and are substituted when another transmission server 223 or MPEG encoder 229 has a trouble.

Master clocks 230 generate a master clock of 27 MHz based on a GPS time correction signal received by a GPS antenna, not shown, and supply the master clock to the TSPP boards provided in the transmission servers 223-1 to 223-9 and the MPEG encoders 229-1 to 229-9.

Of the transmission servers 223-1 to 223-9 and the MPEG encoders 229-1 to 229-9, one transmission server 223 and one MPEG encoder 229 are reserved as spare units (stand-by units), and are substituted when another transmission server 223 or MPEG encoder 229 has a trouble.

In the retention server and 100-channel transmission system 211, the retention servers 221 retain the material obtained by MPEG-compressing (encoding) musical tunes necessary for broadcast, the proceeding table, and all the system configuration necessary for transmission of data of 100 channels (information necessary for controlling the entire system) on their respective external hard disks 221A.

Each transmission server 223 carries out format conversion and multiplexing of 13 channels at the maximum by software means.

The capacity of the external hard disk 221 of the retention server 221 in this embodiment is 500 gigabytes (Gbytes). This is equivalent to the storage capacity for approximately 50,000 tunes in the case where one musical tune has a length of 5 minutes and where the material has a rate of 256 kbps.

| Condition: | |
|---|---|
| sampling frequency | 48 kHz |
| number of quantization bits | 16 bits |
| audio mode | STEREO |
| compression rate | 1/6 (256 kbps) |
| playing time | 5 minutes |

Calculation formula:

48 kHz×16 bits×2×(1/6)×60×5×(1/8) =approximately 10 Mbytes approximately 500 Gbytes/approximately 10 Mbytes =50,000 tunes The file sizes of the proceeding table and all the configuration necessary for 100-channel transmission are extremely small in comparison with the volume of the material.

Access to the retention server 221 from the edit site 101 is carried out in the following cases.

1. Transmission of the proceeding table on each channel for each broadcasting day from the material information management/proceeding organization system 112.
2. Transfer (registration) of the material from the material information registration system 113.
3. Transfer (test listening and reproduction of musical tunes) of the material to the material information registration system 113.
4. Deletion of the material in the retention server 221 from the material information registration system 113.
5. Transfer/deletion of the material for the material information registration system 113 to the archive MO changer 155.
6. Restoration of the material from the archive MO changer 155 of the material information registration system 113.

The system configuration files stored in the retention server 221 are as follows.

Common time:

The entire transmission system commonly has the correct time.

Bit rate table:

Defines the bit rate of a musical channel for transmission.

Channel combination table:

Defines the channel of which the transmission server 223 is in charge.

MUX current use state:

Indicates the currently used system of the secondary multiplexing satellite transmission system 212.

PMT:

A program map table.

Service correspondence table:

A correspondence table of the management channel number and the broadcasting service number.

The transmission system in this case means the organization servers 141, the retention servers 221, the transmission servers 223, switch control PCs 282, and multiplexer controllers (MXC) 244. Among these, common information of the transmission system can be stored in the retention servers 221 and can be referred to or updated at any time during operation of the system.

In the present embodiment, nine transmission servers 223 are provided, and eight of these transmission servers are currently used while the remaining one is reserved as a spare unit. Each transmission server 223 receives, as its input, a material file of a plurality of channels (in this embodiment, 13 channels at the maximum) from the retention server 221 or a material stream from the real-time encoder 229 for carrying out MPEG compression (encoding) in real time, and converts and multiplexes the received input in real time to a transport stream (TS) in conformity to the MPEG system standard by software means.

At the same time, the transmission server 223 also multiplexes the program map table (PMT) and the program clock reference (PCR). This processing is referred to as primary multiplexing. In this manner, a part of PSI (program specific information) prescribed by the MPEG standard such as the PCR packet and the PMT packet is multiplexed in addition to the effective data, time data and null data of the plural channels. Meanwhile, it is also possible to multiplex a program association table (PAT) and a network information table (NIT) as other PSI, and packets prescribed by the user other than PSI.

In the case where broadcasting is carried out on the total of 100 channels as in the present embodiment, six transmission servers 223 of the eight transmission servers 223 carry out primary multiplexing of 13 channels. Another transmission server 223 carries out primary multiplexing of 12 channels, and the remaining one transmission server 223 carries out primary multiplexing of 10 channels. The resultant data are converted to electric signals and outputted in parallel to the currently used and spare multiplexers (MUX) 241-1, 241-2. The similar outputs are also outputted in parallel to TS audio monitors 263. All these electric signals flowing through the cable of the transmission line are signals to the multiplexers 241 and the TS audio monitors 263 from the transmission servers 223, and the contents thereof are TS data, clock sync (CLOCK, SYNC) and data valid (DVALID).

At the time of date updating (4:00), the transmission servers 223 sequentially read out material files necessary for broadcast from external hard disks, not shown, of the transmission servers 223 in accordance with the proceeding tables of the plural channels of which the transmission servers 223 are in charge for the day, obtained by the previous day. At the same time, the transmission servers 223 convert the material streams, which are MPEG-compressed (encoded) in real time by the MPEG encoders 229, to parallel transport stream packets in conformity to the MPEG system standard. Also, the transmission servers 223 prepare the PMT packet, insert the null packet, then multiplex the PCR packet, and attach time information to the PCR packet.

Moreover, at the time of date updating, the transmission servers 223 read out the processing tables of the plural channels of which the transmission servers 223 are in charge for the next day, from the retention servers 221, and copy materials necessary for broadcast of the next day from the retention servers 221 to the external hard disks 223A, not shown, of the transmission servers 223 in accordance with the proceeding tables. Thus, if the retention server 221 has a trouble or if sending of the proceeding tables is delayed, the appropriate measure can be delayed to the next day. Also, if the retention server 221 has a trouble for two or more days or if the proceeding tables have not been sent for two or more days, the proceeding tables for the previous day may be substituted (copied) on the day so as to prevent such a situation that no broadcasting is carried out.

The capacity of the external hard disk 223A of the transmission server 223 in the present embodiment is a storage capacity for two days. If a material is duplicated for the present day and the next day, the disk occupancy capacity is reduced in comparison with the case where materials which are not duplicated at all among all the channels are broadcast. That is, in an extreme case where one material is continuously broadcast for two days on all the channels, the disk occupancy capacity may be only for one material file. Also, depending on the operation, a specified channel may have shorter organization while another specified channel may have longer organization.

If one of the eight transmission server 223 has a trouble and becomes incapable of transmission, broadcasting is stopped on all the channels (for example, 13 channels) of which that transmission server **223-*i* is in charge. Then, all the processes carried out by the transmission server 223-*i* having a trouble are switched to the spare transmission server 223-*j*. (That is, 9/8 redundant switching is carried out.) The switch controls PC 282 rewrite the configuration of the retention servers 221, and then notify the transmission servers 223 and the MXCs 244 of the fact that the configuration has been rewritten. The transmission server 223-*j*, which has been in the stand-by state as the spare unit, obtains from the retention server 221 the proceeding tables of the channels of which the transmission server 223-*i* having a trouble was in charge. Then, the transmission server 223-*j* reads out material files currently necessary for transmission directly from the retention server 221 and starts transmission in accordance with the proceeding tables. At the same time, the MXCs 244 switch the input channels of the MUXs 241. That is, the input gate of the MUX 241** in which a trouble is generated is closed, and the input gate which has been closed as a spare unit is opened. Thus, broadcasting is immediately started (restored).

During this operation, the transmission server **223-*j* searches for the material files necessary for the day and the next day from the proceeding tables of the channels of which the transmission server 223-*j* is in charge, then reads out the material files from the retention server 221, and sequentially copies the material files onto an external hard disk 223A-*j*, not shown. That is, since the transfer time of the file from the retention server 221 to the transmission server 223 is shorter than the reading time of the material file to be transmitted, the materials that should be transmitted are transmitted without waiting for completion of copying of all the materials, and during the interval thereof, copying of the materials is completed. Thus, the transmission server 223**-*j*, which has been in the stand-by state as the spare unit, ultimately has perfectly the same setting as the transmission server 223-*i* having a trouble. Thus, the spare unit need not be replaced by the current use unit after the units are switched because of a trouble. Then, the transmission server 223-*i* having a trouble is set in the stand-by state as a spare unit and can be repaired.

In the secondary multiplexing satellite transmission system 212, the outputs of the transmission servers 223-1 to 223-9 are supplied to the multiplexer 241-1. The multiplexer 241-1 selects the outputs from predetermined eight transmission servers 223 and outputs the selected output to a modulator 242-1, under the control of the MXC 244-1. The modulator 242-1 modulates the inputted data in accordance with the QPSK system and outputs the modulated data to the selector 243.

Similarly, the multiplexer 241-2 selects the outputs from the transmission servers 223 and outputs the selected output to a modulator 242-2, under the control of the MXC 244-2. The modulator 242-2 modulates the inputted data in accordance with the QPSK system and outputs the modulated data to the selector 243.

From the transmission servers 223, data is transferred to the MXCs 244 and the TS audio monitors 263 in the form of DVB (digital video broadcasting) parallel or LVDS.

The selector 243 selects either the signal inputted from the modulator 242-1 or the signal inputted from the modulator 242-2, and outputs the selected signal to the satellite through an intermediate frequency (IF) processing circuit, not shown, under the control of the switch control PCs 282.

The multiplexers 241 and MXCs 244 are suitably supplied with predetermined signals from a broadcasting management system, not shown, for managing overall broadcast.

The secondary multiplexing satellite transmission system 212 has a transmission system A and a transmission system B. The multiplexer 241-1 constituting the transmission system A is supplied with the outputs of the transmission servers 223-1 to 223-9. The multiplexer 241-1 selects the outputs from predetermined eight transmission servers 223 and outputs the selected output to the modulator 242-1, under the control of the MXC 244-1. The modulator 242-1 modulates the inputted data in accordance with the QPSK system and outputs the modulated data to the selector 243.

Similarly, the multiplexer 241-2 constituting the transmission system B selects the outputs from the transmission servers 223 and outputs the selected output to the modulator 242-2, under the control of the MXC 244-2. The modulator 242-2 modulates the inputted data in accordance with the QPSK system and outputs the modulated data to the selector 243.

From the transmission servers 223, data is transferred to the MXCs 244 and the TS audio monitors 263 in the form of DVB (digital video broadcasting) parallel or LVDS.

The selector 243 selects either the signal inputted from the modulator 242-1 or the signal inputted from the modulator 242-2, and outputs the selected signal to the satellite through the intermediate frequency (IF) processing circuit, not shown, under the control of the switch control PCs 282.

The multiplexers 241 and MXCs 244 are suitably supplied with predetermined signals from the broadcasting management system, not shown, for managing overall broadcast.

In the secondary multiplexing satellite transmission system 212, TSs obtained by primary multiplexing of PES (program elementary stream) packets, PMT packets and PCR packets of 13 channels supplied from the eight transmission servers 223 are inputted to the multiplexer 241. The multiplexer 241, as the secondary multiplexing device, multiplexes and outputs these packets and all the packets to be transmitted to the satellite such as a packet necessary for program selection other than PMT, a program guide packet, a program management packet, and a client management packet. This output has an error correction code added thereto and QPSK-modulated by the QPSK modulator, and is outputted as a modulation signal.

The MXC 244 receives operation data (prescribing the operation of overall broadcast) for the next day from the broadcasting management system, not shown, at 26:30 every day, then prepares a PMT file at 27:50, and transfers the PMT file as PMT.new to the retention server 221 through the HUB 222. Also, the MXC 244 transfers the setting and schedule of transmission of all the packets to be transmitted to the satellite such as the packet necessary for program selection other than PMT, the program guide packet, the program management packet and the client management packet, to the multiplexer 241.

The structure in the case where transmission or receiving is viewed from the currently used MXC 244-1 (or 244-2) arranged at the center will now be described.

The MXCs 244 include two units, that is, the MXC 244-1 (MXC-A) and the MXC 244-2 (MXC-B), and separately control the above-described system A and system B. However, only the MXC 244 of the currently used system sends control information to the transmission server 223 through the HUB 222, and to the TS audio monitor 263 through another HUB, not shown, and also to a switch console of a 100-channel monitor 261 of the 100-channel monitor system 213 through another HUB and a channel setter PC 262. Recognition of the currently used system and the spare system is carried out in accordance with the configuration on the retention server 221.

One of the main functions of the MXC 244 is setting of various parameters. It sets initial parameters, and does not take part in transmission operation unless any abnormality occurs. Another function of the MXC 244 is abnormality monitoring. It monitors peripheral devices and notifies an alarm PC 283 of abnormality. In response to a switching instruction from the switch control PC 282, the MXC 244 carries out switch control in accordance with the configuration on the retention server 221.

The MXC 244-1 and the MXC 244-2 request writing of dummy data for every five minutes and confirm execution of writing, thereby monitoring each other. If the spare MXC notifies the alarm PC 283 of abnormality of the currently used MXC, the monitoring person judges this notification and controls the switch control PC 282 to switch the currently used MXC and the spare MXC.

The functions of the currently used MXC 244 are described as follows.

Reception of various transmission control information from the broadcasting management system.

Transmission of the PMT file to the retention server 221.

Reception of the time and the configuration such as designation of the currently used/spare system from the retention server 221.

Notification of abnormality to the alarm PC 283.

Reception of the switching instruction from the switch control PC 282.

Setting and monitoring of the MUX 241 of the currently used system.

Switching of the input channel of the MUX 241 of the currently used system at the time when abnormality occurs in the transmission server 223.

Transmission of an error of the input channel of the MUX 241 of the currently used system.

Setting and monitoring of the QPSK modulator 242 of the currently used system.

Monitoring of the MXC 244 of the spare system.

Setting and monitoring of the TS audio monitor 263.

Setting and monitoring of the channel setter PC 262.

The functions of the MXC 244 of the spare system are described as follows.

Reception of various transmission control information from the broadcasting management system.

Reception of the time and the configuration such as designation of the currently used/spare system from the retention server 221.

Notification of abnormality to the alarm PC 283.

Reception of the switching instruction from the switch control PC 282.

Setting and monitoring of the MUX 241 of the spare system.

Transmission of an error of the input channel of the MUX 241 of the spare system at the time when abnormality occurs in the transmission server 223.

Setting and monitoring of the QPSK modulator 242 of the spare system.

Monitoring of the MXC 244 of the currently used system.

As described above, there are the multiplexer 241, the QPSK modulator 242 and the MXC 244 of the system A and those of the system B, and these units independently operate in parallel. The output of each QPSK modulator 242 is supplied to the selector 243, and the switch controls PC 282 carry out this switching. Thus, the currently used system and the spare system are switched. (That is, A/B switching is carried out.) The MXCs 244 independently transfer the setting and schedule to the respective MUXs 241. However, transmission of the PMT file to the retention server 221, setting and monitoring of the TS audio monitor 263, and setting and monitoring of the channel setter PC 262 are carried out only by the MXC 244 of the currently used system.

The 100-channel monitoring system 213 has the audio 100-channel monitor 261. This audio 100-channel monitor 261 is supplied with the outputs of the modulators 242-1, 242-2 and the outputs of the TS audio monitors 263. In addition, the audio 100-channel monitor 261 is supplied with received IF signals which are obtained by receiving electronic waves from the satellite by using a receiver, not shown, and demodulating the received electronic waves. Moreover, the audio 100-channel monitor 261 is supplied with an output of an OA listening PC 265 after decoding by the MPEG decoder 266. The audio 100-channel monitor 261 can suitably monitor these inputs. The channel setter PC 262 controls the 100-channel monitor 261.

The 100-channel monitor system 213 is a system for monitoring whether or not transmission is correctly carried out on all the channels. First, electronic waves transmitted from the satellite are received and distributed to IRDs (integrated receivers and decoders), not shown, as 100 receivers. Sounds are reproduced by the individual IRDs and displayed at a time on the peak level meter for 100 channels in the 100-channel monitor 261. The monitoring person can instantaneously learn the transmission state from the movement of the meter. Also, a level detector, not shown, is provided in the 100-channel monitor 261. If the state of −50 dB or less (silence) has continued for 30 seconds or more, the indicator on the peak level meter is caused to flash in red and an alarm sound is given, thereby attracting attention of the monitoring person. The monitoring person, having learned this, selects the channel and outputs the sound through the speaker so as to examine whether there is a trouble or not. The threshold value of this level and the detection time setting can be changed.

If abnormality is detected in the transmission system of the satellite, the inputs to the 100-channel monitor 261 are simultaneously switched from the outputs of the IRDs (CS-IF) to the output of the QPSK modulator 242 of the currently used system, and the sound before satellite transmission is checked in accordance with the peak level meter of 100 channels and one sound selected by the switch console 341. In necessary, the input is switched to the output of the QPSK modulator 242 of the spare system, and the sound before satellite transmission is checked in accordance with the peak level meter of 100 channels and one selected sound.

If there is any further problem, a transport stream (TS) of one channel is extracted by demultiplexing from the outputs of the transmission servers 223, that is, the primary multiplexed streams before being inputted to the MUX 241, by the TS audio monitor 263. Then, the extracted transport stream is decoded by the decoder 264 and is checked in accordance with the peak level meter of 100 channels and one selected sound. To simultaneously multiplex 13 channels per transmission server 223, each TS audio monitor 263 simultaneously decodes TSs of 13 channels at the maximum and outputs the sounds of 13 channels. By providing eight TS audio monitors 263 (where one of the nine TS audio monitors is a spare unit), sounds of 100 channels can be simultaneously outputted.

The switch console 341 of the 100-channel monitor 261 has 100 selection switches, and these switches correspond to the individual channel numbers. Meanwhile, since the outputs of the TS monitors 263 physically correspond to the outputs of the transmission servers 223, the outputs of the TS monitors 263 will not correspond to the channel numbers if 9/8 redundant switching is carried out. Therefore, in the present embodiment, which inputs are selected and outputted by the 100 selection switches of the switch console of the 100-channel monitor 261 in accordance with the switching information is set by the channel setter PC 262.

While the channel setter PC 262 controls the switch console of the one 100-channel monitor 261, setting files for controlling the selection switches are transferred from the two MXCs 244. Therefore, communication with the MXCs 244 is carried out through the network using LAN as the dedicated line 103, and communication with the switch console of the 100-channel monitor 261 is carried out through SR-422.

If there is any problem on the stage prior to the transmission servers 223, there is a possibility that a material on the retention server 221 has a cause. Therefore, the material file in question is directly read out from the retention server 221 by the on-air (OA) listening PC 265 and then decoded by the MPEG decoder 266 so that the material file can be checked. The OA listening PC 265 and the MPEG decoder 266 serve as a reproducing device 265.

For example, if there is an abnormal sound in broadcast and received sounds, it is necessary to discriminate whether the recorded material itself has a problem or abnormality is generated in the process of transmission. Thus, the date and channel where there is abnormality are designated and the proceeding table is displayed by the OA listening PC 265. When the material having abnormality is designated on the proceeding table, the OA listening PC 265 reads out and reproduce the designated material from the retention server 221. Thus, it can be determined whether the material itself has a problem or not.

The transmission management system 214 has the switch control PCs 282-1, 282-2, and these switch control PCs 282 are supplied with an output of a station clock 284 for carrying out timer operation. The transmission management system 214 also has OA monitor PCs 281-1, 281-2, and the alarm PC 283.

The OA monitor PCs 281, the switch control PCs 282, the alarm PCs 283 and the OA listening PCs 285 of the transmission management system 214 are connected to the MXCs 244 of the secondary multiplexing satellite transmission system 212.

The transmission management system 214 carries out monitoring and switching of transmission from the retention server and 100-channel transmission system 211 and the secondary multiplexing satellite transmission system 212. The alarms generated in the respective systems are all notified of to the alarm PC 283. In this case, four types of chimes are rung in accordance with the corresponding level, and the alarm number and message appear on the display screen of the alarm PC 283. Also, the measure to deal with the alarm can be referred to in accordance with the GUI. By using the alarm PC 283, the alarm LOG of each system can be seen and the circumstance of generation of the problem can be learned. The system monitoring person learns abnormality from the alarm in this alarm PC 283. Then, the system monitoring person determines the status of trouble and the corresponding measure to take from the display contents of the alarm PC 283, and carries out switching operation from the switch control PC 282, if necessary.

Either one of the two switch control PCs 282-1,282-2 is set for current use and is set in the state where the switching operation can be inputted. Input of the switching operation cannot be carried out from the switch control PC 282 which is set as a spare unit. The switch control PC 282 learns the correct time from the station clock 284 and sets the correct time to the retention server 221. Each peripheral device learns the correct time by referring to the retention server 221. The switch control PC 282 carries out switching to the spare system of the transmission server 223 (9/8 redundant switching) and switching of output of the QPSK modulator 242 by the selector 243 (A/B switching) in accordance with the input by the system monitoring person. At this point, the switch control PC 282 rewrites the configuration of the retention server 221, and then notifies each peripheral device of the fact that the configuration has been rewritten. In response to this notification as a trigger, each peripheral device switches the operation by obtaining the new configuration from the retention server 221.

Switching of output of the QPSK modulator 242 (A/B switching) is carried out in accordance with the instruction from the switch control PC 282 by setting the selector 243 in a remote state. However, it is possible to set the selector 243 in a local state and forcibly carry out switching on the front panel of the body of the selector 243. In such case, the switch control PC 282 learns that switching has been carried out in the selector 243, and switches the configuration of the retention server 221 in accordance with that information. Also, the status of transmission of musical tunes from the transmission server 223 can be learned by using the OA monitor PC 281.

When an arbitrary channel is selected from the GUI on the OA monitor PC 281, the schedule of transmission events (musical tunes) of that channel (that is, the contents of the proceeding table) is displayed as a list. In addition, the title, performer, playing time and remaining time of a musical tune (event) which is currently being transmitted are marked in a color different from the color of the other parts, and the status of current transmission, hysteresis of past transmission and future schedule of transmission can be instantaneously learned. Also, the state of the OA monitor PC 281 is obtained from the transmission server 223 and event updating is carried out with reference to the operation of the transmission server 223. Therefore, the status of abnormality and stop of the transmission server 223 can be learned.

Figure 13:
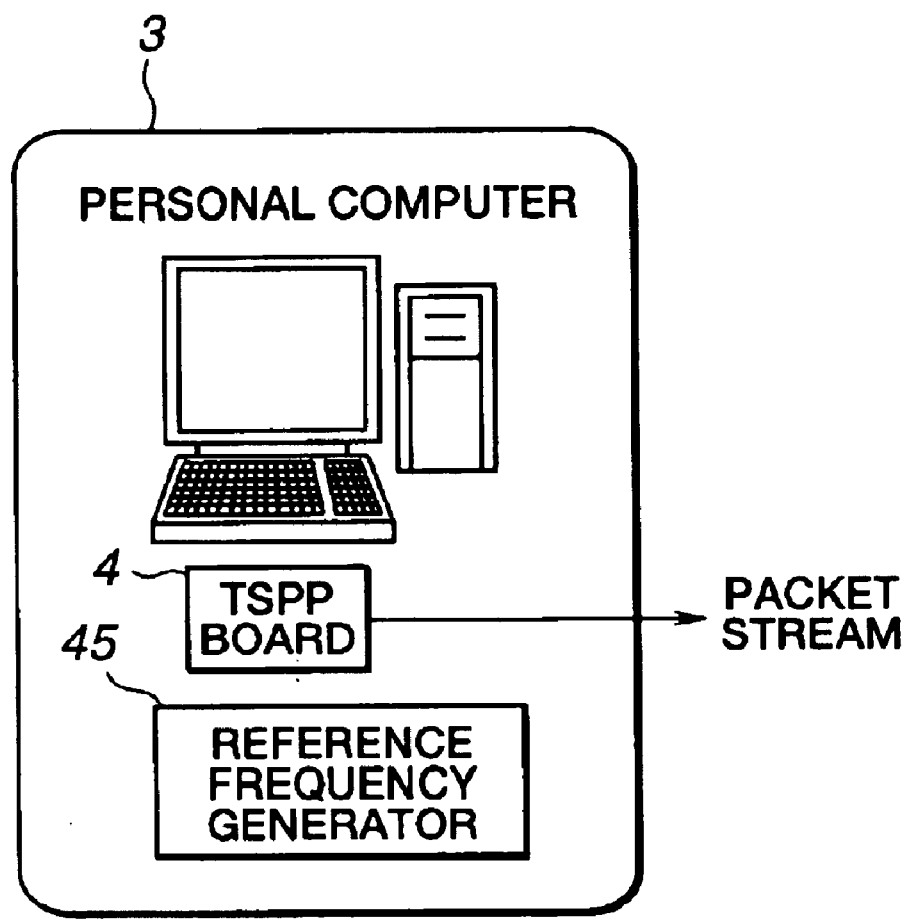
FIG. 13 is a block diagram showing the structure of a data multiplexing device in which a reference frequency generator is provided.
Figure 14:
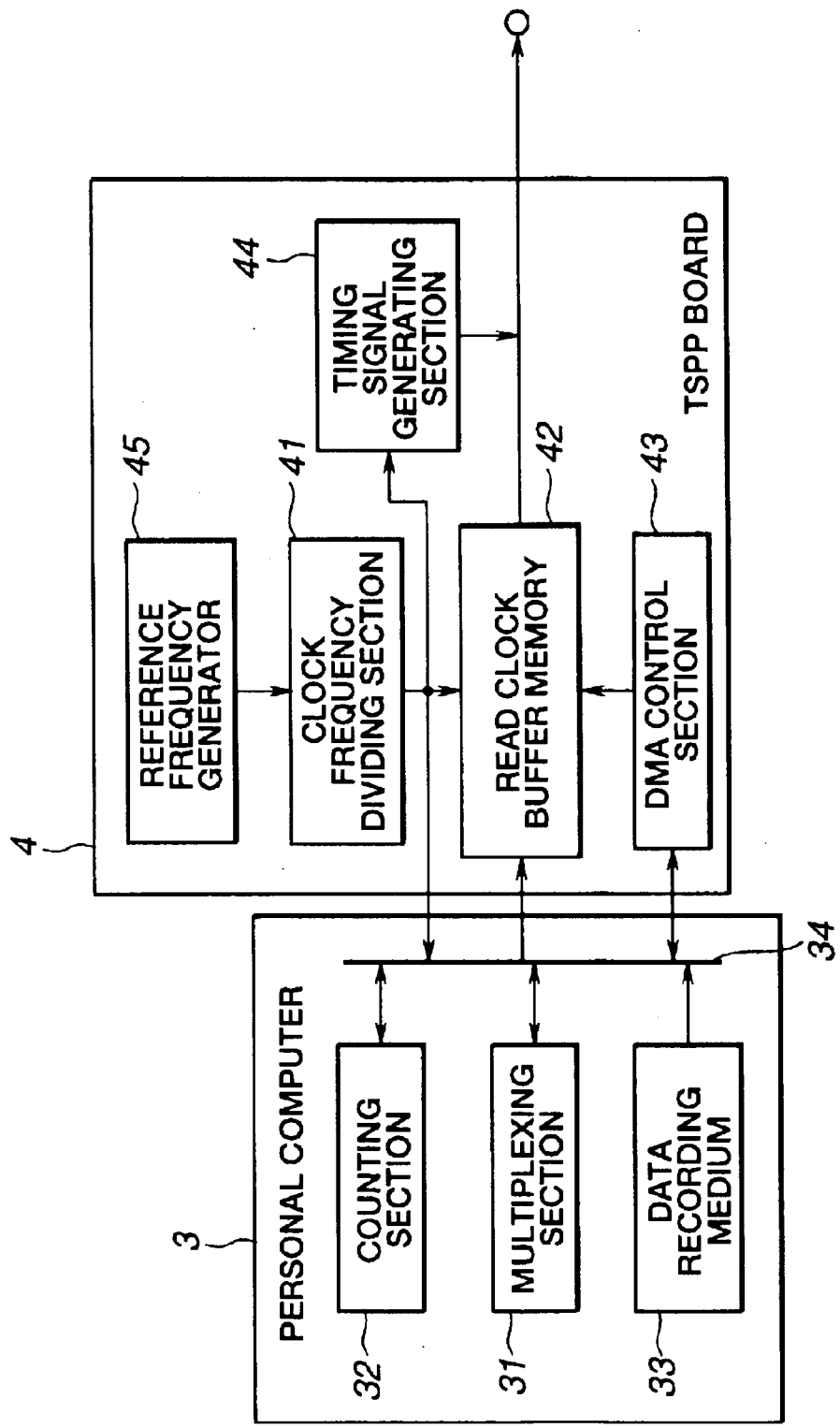
FIG. 14 is a block diagram showing the structure of the data multiplexing device of FIG. 13.

In the above description, the master clock is generated on the basis of signals from the GPS and inputted to the TSPP board 4 from outside. However, by installing on the TSPP board 4 a reference frequency generator 45 having a frequency stability equivalent to that of the reference frequency generator using the GPS, as shown in FIGS. 13 and 14, the entire device can be diminished.

Figure 5:
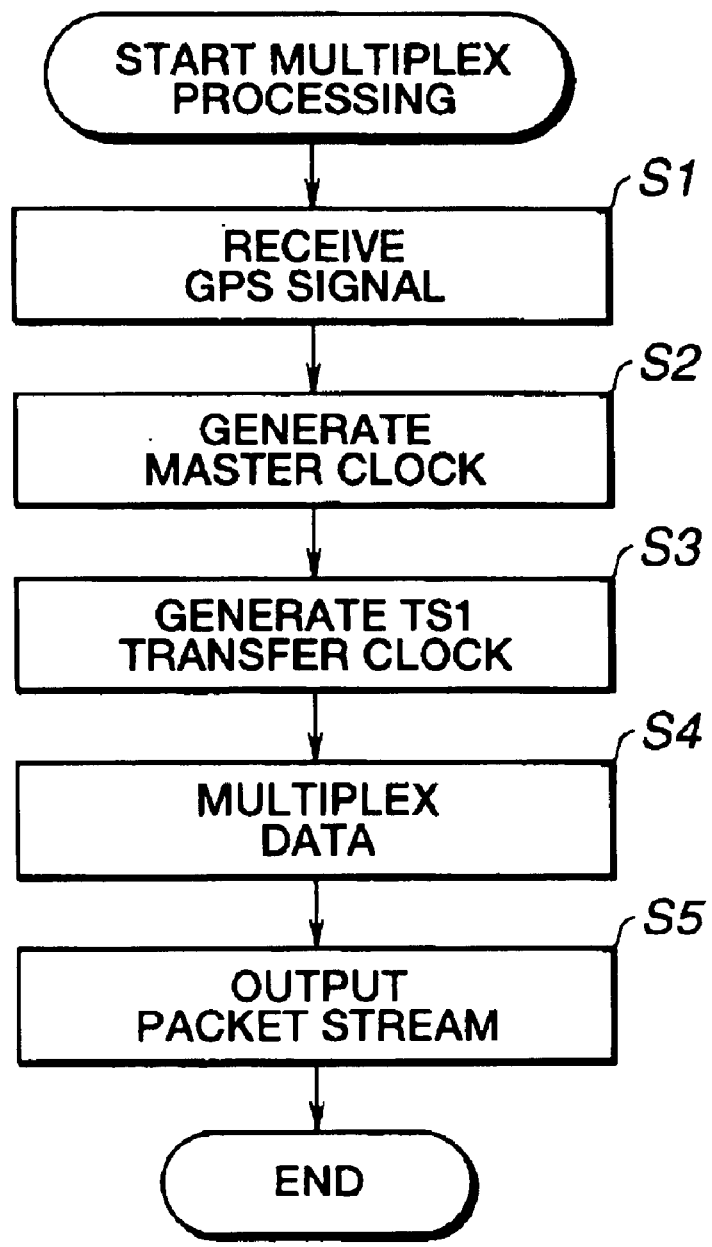
FIG. 5 is a flowchart for explaining multiplex processing carried out in the data multiplexing device to which the present invention is applied.
Figure 15:
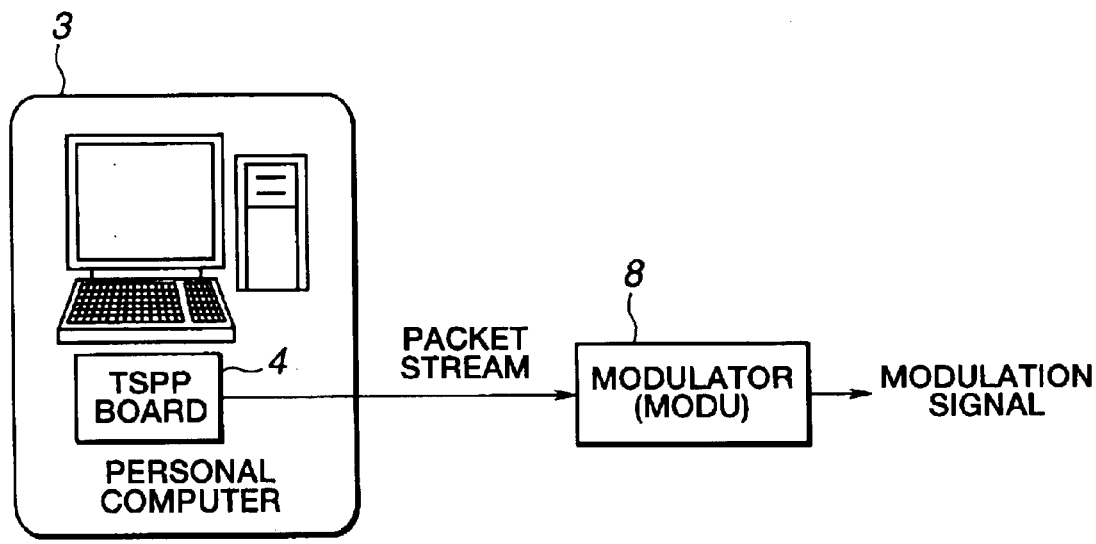
FIG. 15 is a block diagram showing the structure of a data multiplexing device to which the present invention is applied.
Figure 16:
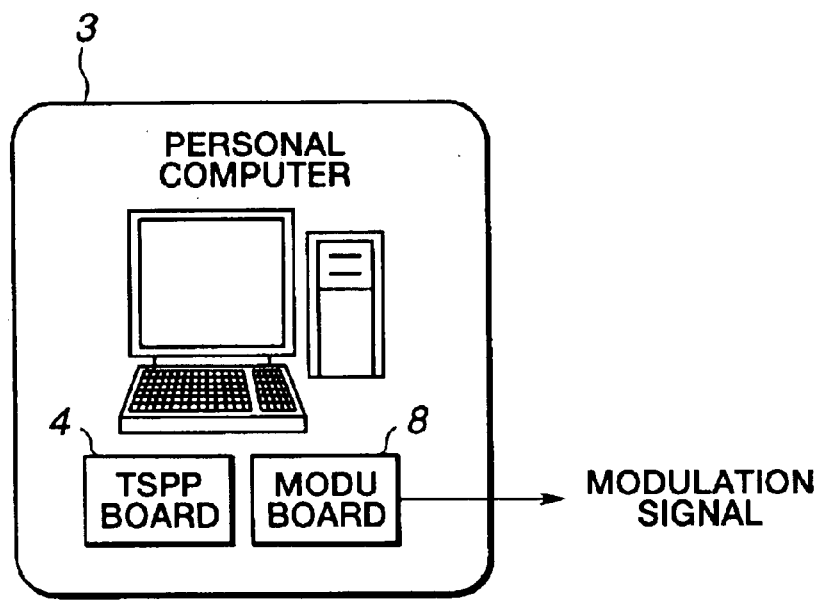
FIG. 16 is a block diagram showing the structure of a data multiplexing device in which a modulator is provided.

As shown in FIG. 15, by multiplexing all the packets of control signals such as NIT and PAT prescribed by the broadcasting standard, by software means similar to that of the multiplexing section 31 of FIG. 5, it is possible to supply data directly to a modulator (MODU) 8 from the TSPP board 4, then modulate the data, and transmit the data to the transmission line. Moreover, as shown in FIG. 16, by providing the modulator (MODU) 8 in the form of board inside of the computer 3, the data from the computer 3 can be outputted directly to the transmission line.

It is a matter of course that this invention is not limited to music broadcasting of 100 channels and can easily be applied to data broadcasting of any digitized information.

In the above-described embodiment, the MPEG system is used as the compression system as a matter of convenience in description. However, other compression systems such as AC-3 and ATRAC can also be used. In addition, this invention can be applied also to the case where compression is not used.

In the above-described embodiment, the transmission line is described on the assumption of the satellite. However, the transmission line may be other real-time transmission lines such as ground waves, an optical space, an optical cable, and a coaxial cable, or storage-type transmission lines such as a magnetic tape, an optical tape, a magnetic disk, and an optical disc.

In the above-described embodiment, the master clock is generated by using the GPS. However, the master clock may be generated on the basis of a standard signal generator using rubidium or cesium unless it has high precision and meets the time precision specification.

As described above, according to the 100-channel digital data transmission device and method, multiplexed data are measured by using a counter synchronized with a master clock. Thus, the quantity of transmitted data and the time required for transmission can be accurately managed.

I claim:

1. A multi-channel digital data transmission device comprising:
    clock generation means for generating a master clock with reference to time correction signals;
    multiplexing means for multiplexing a plurality of data into a packet; and
    storage means for storing the packet sent from the multiplexing means;
    so that the packet is inputted to said storage means from the multiplexing means and the packet stored in the storage means is outputted from the storage means as a continuous stream by using a counter synchronized with the master clock.

2. The multi-channel digital data transmission device as claimed in claim 1, wherein the clock generation means generates a master clock having a higher precision than a clock used for multiplexing by the multiplexing means.

3. The multi-channel digital data transmission device as claimed in claim 1, wherein the multiplexing means carries out processing for multiplexing a plurality of data into a packet by using software.

4. A multi-channel digital data transmission comprising:
clock generation means for generating a master clock with reference to time correction signals:
multiplexing means for multiplexing a plurality of data into a packet; and
storage means for storing the packet sent from the multiplexing means;
so that the packet stored in the storage means is outputted as a continuous stream by using a counter synchronized with the master clock,
wherein the multiplexing means multiplexes effective data, time data and null data of a plurality of channels.

5. A multi-channel digital data transmission device comprising:
clock generation means for generating a master clock with reference to time correction signals;
multiplexing means for multiplexing a plurality of data into a packet; and
storage means for storing the packet sent from the multiplexing means;
so that the packet stored in the storage means is outputted as a continuous stream by using a counter synchronized with the master clock,
wherein the multiplexing means multiplexes a part of program specific information (PSI) including a program clock reference value (PCR) and a program map table (PMT).

6. A multi-channel digital data transmission comprising:
clock generation means for generating a master clock with reference to time correction signals;
multiplexing means for multiplexing a plurality of data into a packet; and
storage means for storing the packet sent from the multiplexing means;
so that the packet stored in the storage means is outputted as a continuous stream by using a counter synchronized with the master clock,
wherein the multiplexing means has:
multiplexing/packet generation means;
packet counting means for counting the number of packets outputted from the storage means;
time measurement means for measuring time;
discrimination means for discriminating whether the number of packets counted by the packet counting means is a predetermined number or not on the basis of the time measured by the time measurement means; and
control means for controlling generation of packets in the multiplexing means in accordance with the result of discrimination in the discrimination means.

7. The multi-channel digital data transmission device as claimed in claim 6, wherein the multiplexing/packet generation means multiplexes effective data, time data and null data of a plurality of channels.

8. The multi-channel digital data transmission device as claimed in claim 6, further comprising time data adding means for adding time data to the packet generated by the multiplexing means, in accordance with number of packets counted by the packet counting means.

9. The multi-channel digital data transmission device as claimed in claim 1, wherein the clock generation means generates a master clock using a time correction signal from a GPS satellite.

10. A multi-channel digital data transmission device comprising:
clock generation means for generating a master clock with reference to time correction signals;
multiplexing means for multiplexing a plurality of data into a packet; and
storage means for storing the packet sent from the multiplexing means;
so that the packet stored in the storage means is outputted as a continuous stream by using a counter synchronized with the master clock, further comprising frequency division means for dividing the frequency of a master clock of a first frequency generated by the clock generation means to the power of 2, thereby generating a clock of a second frequency, so that the packet stored in the storage means is outputted as a continuous stream by using a counter synchronized with the clock of the second frequency.

11. A multi-channel digital data transmission comprising:
clock generation means for generating a master clock with reference to time correction signals;
multiplexing means for multiplexing a plurality of data into a packet; and
storage means for storing the packet sent from the multiplexing means;
so that the packet stored in the storage means is outputted as a continuous stream by using a counter synchronized with the master clock, said device further comprising external packet input means, thus generating a packet.

12. A multi-channel digital data transmission method comprising:
a clock generation step for generating a master clock with reference to time correction signals;
a multiplexing step for multiplexing a plurality of data into a packet; and
a storage step for storing the packet sent from the multiplexing step;
so that the packet is inputted into a storage means in said storage step and the packet stored at the storage step is outputted from said storage means as a continuous stream by using a counter synchronized with the master clock.

13. A multi-channel digital data transmission comprising:
a clock generation step for generating a master clock with reference to time correction signals;
a multiplexing step for multiplexing a plurality of data into a packet; and
a storage step for storing the packet sent from the multiplexing step;
so that the packet stored at the storage step is outputted as a continuous stream by using a counter synchronized with the master clock, wherein the multiplexing step includes multiplexing of effective data, time data and null data of a plurality of channels.

14. A multi-channel digital data transmission comprising:

a clock generation step for generating a master clock with reference to time correction signals;

a multiplexing step for multiplexing a plurality of data into a packet; and a storage step for storing the packet sent from the multiplexing step;

so that the packet stored at the storage step is outputted as a continuous stream by using a counter synchronized with the master clock, wherein the multiplexing step includes multiplexing of a part of program specific information (PSI) including a program clock reference value (PCR) and a program map table (PMT).

* * * * *